(12) United States Patent
Heyral et al.

(10) Patent No.: US 11,215,323 B2
(45) Date of Patent: Jan. 4, 2022

(54) PRESSURE REGULATOR WITH INBUILT SAFETY VALVE TO RELIEVE PRESSURE IN THE EVENT OF AN OVERPRESSURE DOWNSTREAM

(71) Applicant: ALCRYS FLUID-CONTROL & SERVICES, Gardanne (FR)

(72) Inventors: Olivier Heyral, Meyreuil (FR); Zsolt Zsigmond, Margency (FR)

(73) Assignee: ALCRYS FLUID-CONTROL & SERVICES, Gardanne (FR)

( * ) Notice: Subject to any disclaimer, the term of this patent is extended or adjusted under 35 U.S.C. 154(b) by 0 days.

(21) Appl. No.: 17/232,442

(22) Filed: Apr. 16, 2021

(65) Prior Publication Data

US 2021/0231267 A1    Jul. 29, 2021

Related U.S. Application Data

(63) Continuation of application No. PCT/FR2018/052600, filed on Oct. 18, 2018.

(51) Int. Cl.
*F17C 13/04* (2006.01)
*G05D 16/04* (2006.01)
*G05D 16/10* (2006.01)

(52) U.S. Cl.
CPC ......... *F17C 13/04* (2013.01); *G05D 16/0402* (2019.01); *G05D 16/10* (2013.01);
(Continued)

(58) Field of Classification Search
None
See application file for complete search history.

(56) References Cited

U.S. PATENT DOCUMENTS 3,526,256 A * 9/1970 Jones ................. F16K 1/307
141/207
2003/0215688 A1* 11/2003 Yang ................. H01M 8/04208
429/513

(Continued)

FOREIGN PATENT DOCUMENTS

FR    2879721    6/2006
FR    2984448    6/2013

(Continued)

OTHER PUBLICATIONS

International Search Report for International Application PCT/FR2018/052600, dated Jun. 27, 2019.

*Primary Examiner* — Daphne M Barry
(74) *Attorney, Agent, or Firm* — Burris Law, PLLC

(57) ABSTRACT

A pressure regulator includes a downstream body delimiting a low pressure chamber; an upstream body delimiting a high pressure chamber and carrying an expansion seat; a movable piston having an inner channel having an upper end forming a discharging seat and a lower end opening onto an intermediate chamber connected to a leakage circuit; a tubular valve rod passing through the inner channel of the piston and an inner channel of the upstream body, having an upper end forming a discharging valve and a lower end forming a regulating flap suitable for bearing on the expansion seat; a first biasing member compressed between the piston and the upstream body by biasing the piston towards the downstream body; and a second biasing member compressed between the piston and a plate secured to the valve rod, biasing the rod in the direction of pressing the discharging valve against the discharging seat.

20 Claims, 17 Drawing Sheets

(52) U.S. Cl.
CPC ........... *F17C 2205/0332* (2013.01); *F17C 2205/0338* (2013.01); *F17C 2205/0385* (2013.01); *F17C 2221/012* (2013.01)

(56) References Cited

U.S. PATENT DOCUMENTS

| | | |
|---|---|---|
| 2014/0000809 A1 | 1/2014 | Tatarek |
| 2015/0337769 A1 | 11/2015 | Yoshioka et al. |
| 2016/0281873 A1 | 9/2016 | Yoshioka |

FOREIGN PATENT DOCUMENTS

| | | |
|---|---|---|
| FR | 3003656 | 9/2014 |
| WO | 2013135983 | 9/2013 |

\* cited by examiner

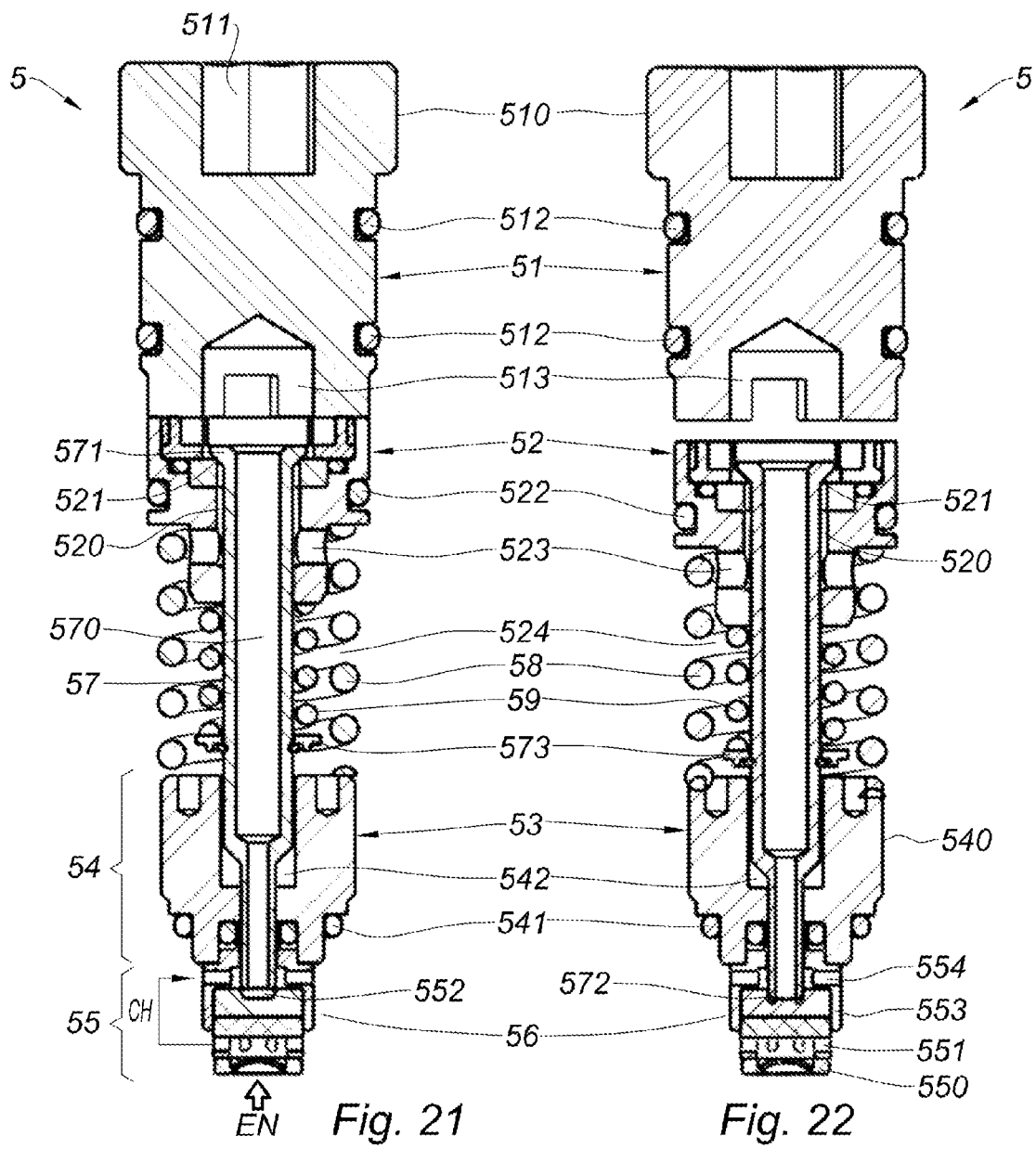
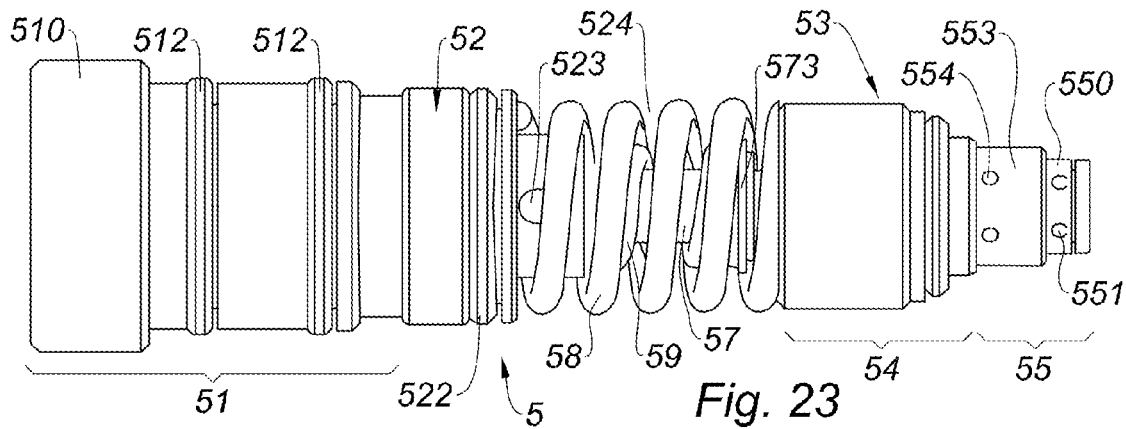

PRESSURE REGULATOR WITH INBUILT SAFETY VALVE TO RELIEVE PRESSURE IN THE EVENT OF AN OVERPRESSURE DOWNSTREAM

CROSS-REFERENCE TO RELATED APPLICATIONS

This application is a continuation of International Application No. PCT/FR2018/052600, filed on Oct. 18, 2018. The disclosure of the above application is incorporated herein by reference.

FIELD

The present disclosure relates to a gas pressure regulator, as well as to a device for filling and withdrawing gas having such a pressure regulator.

BACKGROUND

The statements in this section merely provide background information related to the present disclosure and may not constitute prior art.

Conventionally, a device for filling and withdrawing gas comprises a withdrawing circuit provided with a storage connector connected to a container for storing a pressurized gas and a withdrawing connector connected to a withdrawing device for withdrawing a reduced pressure gas, and a filling circuit provided with a filling connector configured for a connection with a source of pressurized gas for the filling of the storage container. One application for such device is in the filling and withdrawing of gaseous hydrogen to supply a withdrawing device of a fuel cell type, in particular within a vehicle.

To withdraw gas under high pressure, conventionally between 350 and 700 bars for gaseous hydrogen storage tanks, in order to distribute it at low pressure, conventionally between 1 and 5 bars, it is desired to use a device or tap for filling and withdrawing gas which will have the function of allowing a connection with a pressure source in order to fill the storage container when desired, and also to control the gas withdrawing operations, including isolation, safety and gas discharging operations.

The state of the art can be illustrated by the teaching of document WO2013/135983 which discloses a gas filling and withdrawing tap, in which a safety circuit connected to the withdrawing circuit and comprising a safety valve to evacuate the contents of the tank to the outside in the event of a dangerous situation (excessive temperature and/or pressure) is provided.

The state of the art can also be illustrated by document FR2879721 which discloses a conventional gas pressure regulator, as well as by document FR2984448 which concerns a gas pressure regulator with inbuilt overpressure safety.

Leaks can be particularly undesirable in the context of gaseous hydrogen filling and withdrawing devices, in particular within a vehicle transporting people.

SUMMARY

This section provides a general summary of the disclosure and is not a comprehensive disclosure of its full scope or all of its features.

The present disclosure provides a pressure regulator which incorporates a discharging valve configured for a discharge towards a leakage circuit in the event of downstream overpressure, that is to say in the event of the downstream pressure being exceeded beyond a predefined threshold pressure. Indeed, in the field of gas expansion, a downstream overpressure is liable to impact the equipment, and in particular the seals, resulting in leaks.

The present disclosure provides in particular a pressure regulator which incorporates such an overpressure discharging valve, that is to say that the pressure regulator has its own discharging valve, which contributes to increased safety and compactness.

The present disclosure also provides a reliable pressure regulator for expanding a gas between an upstream pressure in the range of 350 to 700 bars and a downstream pressure in the range of 10 to 30 bars, and also for expanding a gas between an upstream pressure in the range of 10 to 30 bars and a downstream pressure in the range of 0.5 to 5 bars.

The present disclosure also provides a pressure regulator suitable for a filling and withdrawing device that is both compact and of reduced weight.

For this purpose, it refers to a pressure regulator comprising a static downstream body delimiting a low pressure chamber at the outlet of the pressure regulator; an upstream body delimiting a high pressure chamber at the inlet of the pressure regulator and carrying an expansion seat disposed facing an inner channel formed in an upper portion of the upstream body; a movable piston forming a regulating part on which the gas from the low pressure chamber press on one side and a first biasing member press on the other side; a regulating flap cooperating with the regulating part and movable relative to the expansion seat between an upstream position for closing the communication between the low pressure chamber and the high pressure chamber and a downstream position for opening the communication between the low pressure chamber and the high pressure chamber. The pressure regulator being advantageous in that the piston has an inner channel passing through and having two opposite ends (an open upper end and a lower end). The open upper end, on the side of the downstream body, facing the low pressure chamber and forming a discharging seat, and the lower end which opens onto an intermediate chamber interposed between the upstream body and the downstream body, wherein said intermediate chamber is connected to a leakage circuit.

The pressure regulator further comprises a tubular valve rod provided with an inner channel, the valve rod passing through both the inner channel of the piston and the inner channel of the upper portion of the upstream body, so that the valve rod includes a flared upper end forming a discharging flap suitable for bearing on the discharging seat provided at the upper end of the inner channel of the piston; and a lower end forming the regulating flap suitable for bearing on the expansion seat.

The first biasing member is compressed between the piston and the upstream body by biasing the piston in the direction of the downstream body, and a second biasing member is compressed between the piston and a plate secured to the valve rod biasing the valve rod, relative to the piston, in the direction of pressing the discharging flap against the discharging seat.

Thus, the pressure regulator incorporates a discharging valve configured for a discharge to a downstream overpressure leakage circuit, wherein the discharging valve comprises the discharging flap formed at the valve rod, the discharging seat formed at the level of the piston, and the second biasing member.

Indeed, in the event of an overpressure in the low pressure chamber, that is to say in the case where the downstream pressure exceeds a predefined threshold pressure (which depends on the gas bearing surfaces and the spring coefficients of the biasing members), the overpressure in the low pressure chamber acts on the piston in the direction of a separation from the downstream body sufficient for the regulating flap to be in the upstream closed position, under the effect of the second biasing member which pushes the valve rod.

The valve rod being in abutment on the expansion seat and the piston being sufficiently far from the downstream body, the discharging flap detaches from the discharging seat and thus passes into the downstream open position, allowing communication between the low pressure chamber and the discharging conduit connected to the leakage circuit, and thus the discharge takes place in the leakage circuit and the downstream pressure is released.

According to a one form, the second biasing member extends inside the first biasing member.

According to another form, the first biasing member and the second biasing member are helical springs.

According to yet another form, the plate is formed of a circlip tight around the valve rod. As a variant, the plate is welded or crimped onto the valve rod, or else the plate is integral with the valve rod.

In a particular form, the upper portion of the upstream body is provided with an outer thread for fixing by screwing in a bore.

In a particular form, the upstream body has the upper portion extended by a lower portion, wherein the upper portion faces the piston, and said lower portion has a lower dome bearing on the bottom of a bore for an inlet of gas, wherein the lower dome is provided with side holes opening into the high pressure chamber.

Advantageously, the lower dome has an upper face facing the lower end of the inner channel of the upper portion of the upstream body, and a cavity is formed in the upper face to form the expansion seat.

According to one form of the present disclosure, the lower portion of the upstream body comprises a cylindrical wall which surrounds the upper face of the lower dome, wherein the cylindrical wall is provided with side holes opening into the high pressure chamber.

According to another form of the present disclosure, the downstream body forms a cover or plug accessible from the outside of a body.

Advantageously, the downstream body has on the outer periphery two O-ring seals inside a bore, and a leakage conduit connected to the leakage circuit opens into the bore between the two O-ring seals.

In accordance with another form of the present disclosure, the downstream body is fastened by screwing inside a bore.

In an advantageous form, the pressure regulator comprises a safety system with manual reset configured to automatically close the communication between the low pressure chamber and the high pressure chamber when the downstream pressure in the low pressure chamber drops below a predefined low threshold pressure corresponding to an increase in the gas flow rate at the outlet of the pressure regulator, in particular associated with a downstream leak (and in particular with a leak in a withdrawing device placed downstream of the pressure regulator).

Such a safety system allows a closure of the communication between the low pressure chamber and the high pressure chamber in the event that the downstream pressure (pressure in the low pressure chamber) drops below a low threshold pressure (or set value); prohibiting the pressure regulator to restart while the pressure drop fault (which notably reflects a leak in the withdrawing device) has not been resolved; and allowing the pressure regulator to restart only by manual reset, once the pressure drop fault (or a leak in the withdrawing device) has been resolved.

The low threshold pressure can be established by considering a maximum value of gas flow rate at the outlet of the pressure regulator which is considered as a high threshold not to be exceeded for the flow rate because it reflects a malfunction at the level of the withdrawing device which may correspond to a leak.

According to one form, the safety system comprises a shutter finger movably mounted in the downstream body facing the open upper end of the valve rod, wherein the shutter finger is selectively displaceable between a lowered position wherein the shutter finger is brought closer to the open upper end of the valve rod; and a raised position wherein the shutter finger is moved away from the open upper end of the valve rod.

According to another form, the shutter finger is slidably mounted in an orifice formed through the downstream body.

Advantageously, the shutter finger has at the outer periphery two O-ring seals inside the orifice of the downstream body, a leakage conduit connected to the leakage circuit is formed in the downstream body by opening into said orifice between the two O-ring seals.

According to one form, the safety system comprises an adjustment screw screwed into a thread provided in the orifice of the downstream body to allow the shutter finger to be selectively displaced by screwing/unscrewing the adjustment screw which abuts on the shutter finger.

According to another form, the safety system comprises a hollow stop screw screwed into a thread provided in the orifice of the downstream body to form an upper stop abutment for the adjustment screw, and a lower stop abutment for the adjustment screw is formed by an inner shoulder in said orifice.

The present disclosure also relates to a device for filling and withdrawing gas, comprising a withdrawing circuit and a filling circuit. The withdrawing circuit comprising an upstream end provided with a storage connector configured for a connection with a storage container for a pressurized gas, and a downstream end provided with a withdrawing connector configured for a connection with a withdrawing device for withdrawing gas at reduced pressure, wherein said withdrawing circuit comprises at least one controlled isolation gate and at least one pressure regulator according to the present disclosure. The filling circuit comprising an upstream end provided with a filling connector configured for a connection with a source of pressurized gas for filling the storage container, and a downstream end connected to the upstream end of the withdrawing circuit.

Advantageously, the withdrawing circuit comprises a first pressure regulator and a second pressure regulator in series, wherein each pressure regulator is in accordance with the present disclosure.

The use of two pressure regulators in series allows to reliable the regulation of the pressure between the high-pressure storage container and the withdrawing device operating at low pressure.

According to a particular form, only the second pressure regulator incorporates a safety system with manual reset as described above.

The present disclosure also relates to a use of a filling and withdrawing device, wherein the storage connector is connected to a container for storing pressurized gaseous hydrogen and the withdrawing connector is connected to a withdrawing device of a fuel cell type.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 21 and 22 are schematic cross-sectional views of a first pressure regulator in accordance with the present disclosure, or high pressure regulator, of the device of FIGS. 2 to 7, in a rest or regulation open configuration (FIG. 21) and in a closed discharging configuration in the event of overpressure in the low pressure chamber (FIG. 22);

FIG. 23 is a schematic side view of the first pressure regulator of FIGS. 21 and 22;

Figure 13:
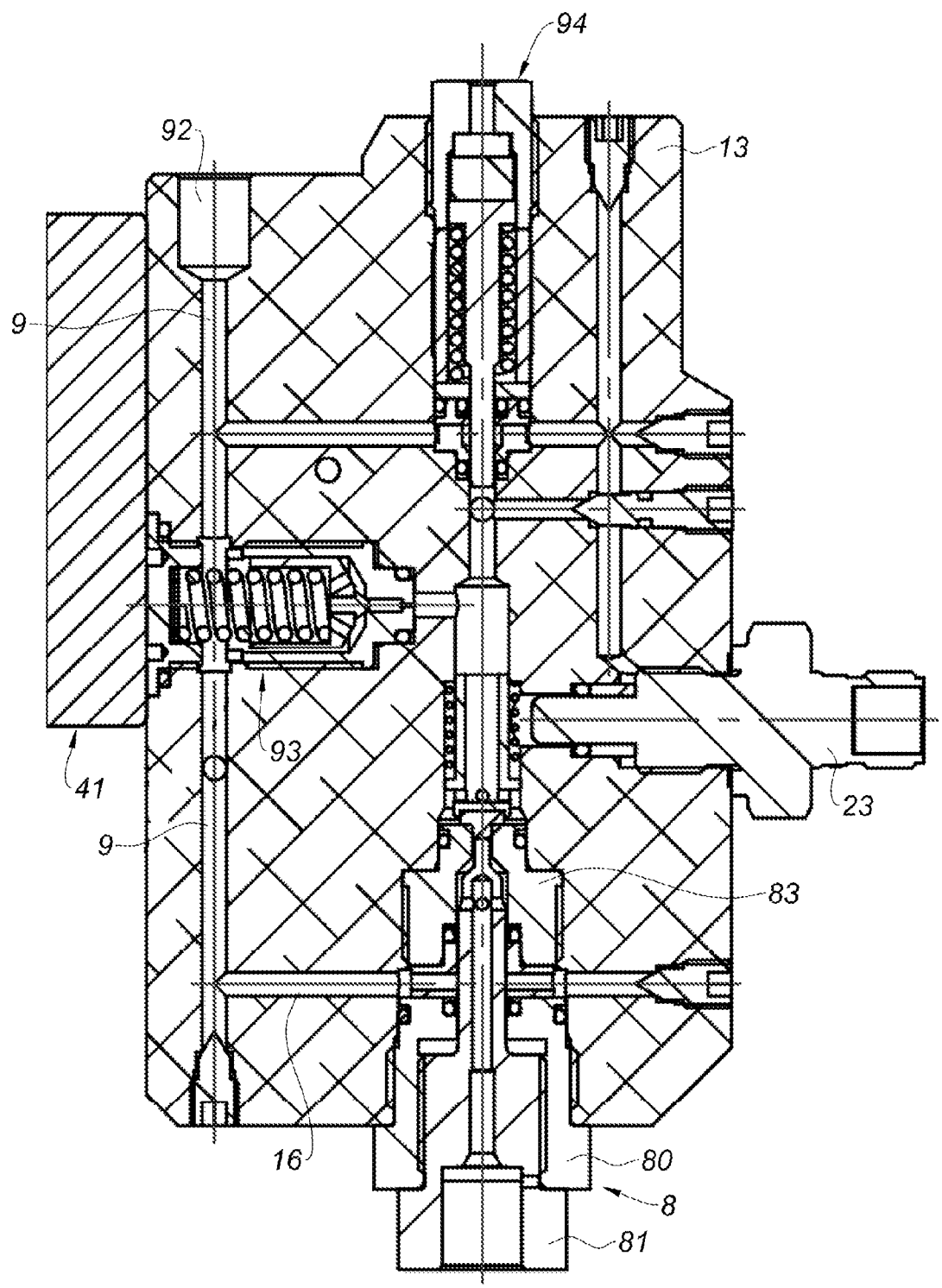
FIG. 13 is a schematic cross-sectional view of the device of FIGS. 2 to 7 along the section plane XIII-XIII of FIG. 6.
Figure 14:
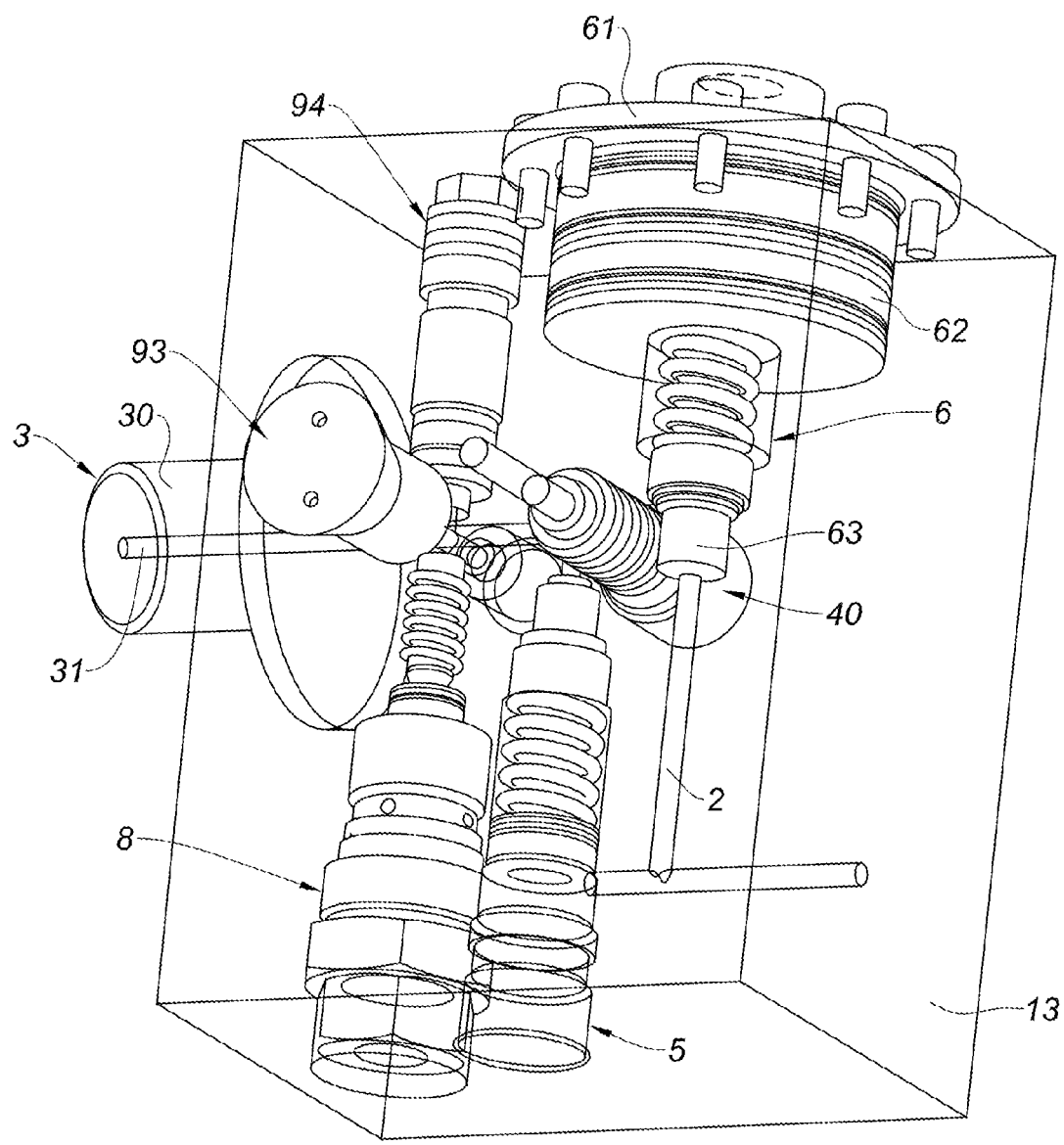
FIG. 14 is a schematic perspective and partially transparent view of the device of FIGS. 2 to 7.
Figure 15:
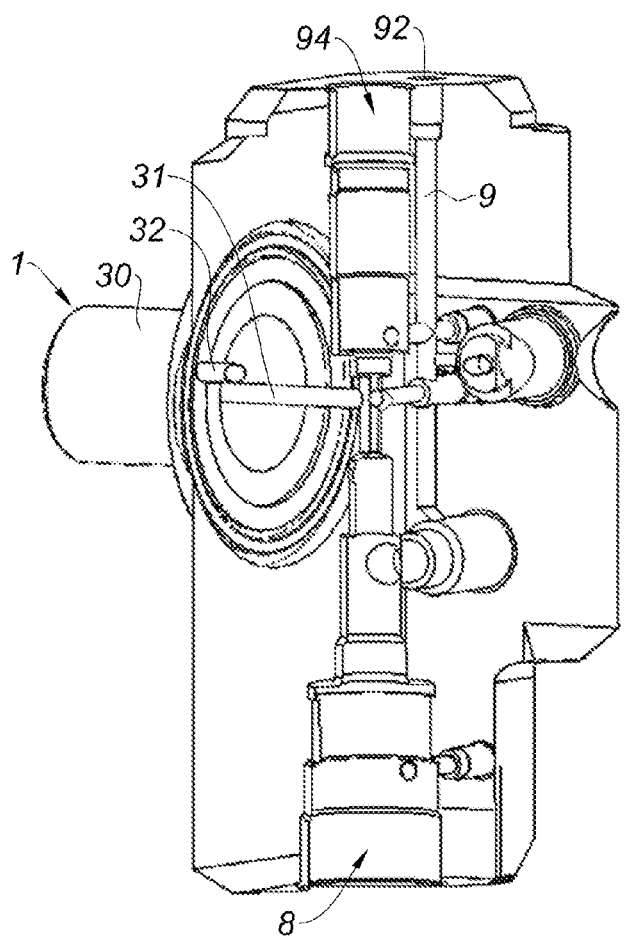
FIGS. 15 to 18 are schematic perspective views of the device of FIGS. 2 to 7 cut along different sectional planes.
Figure 24:
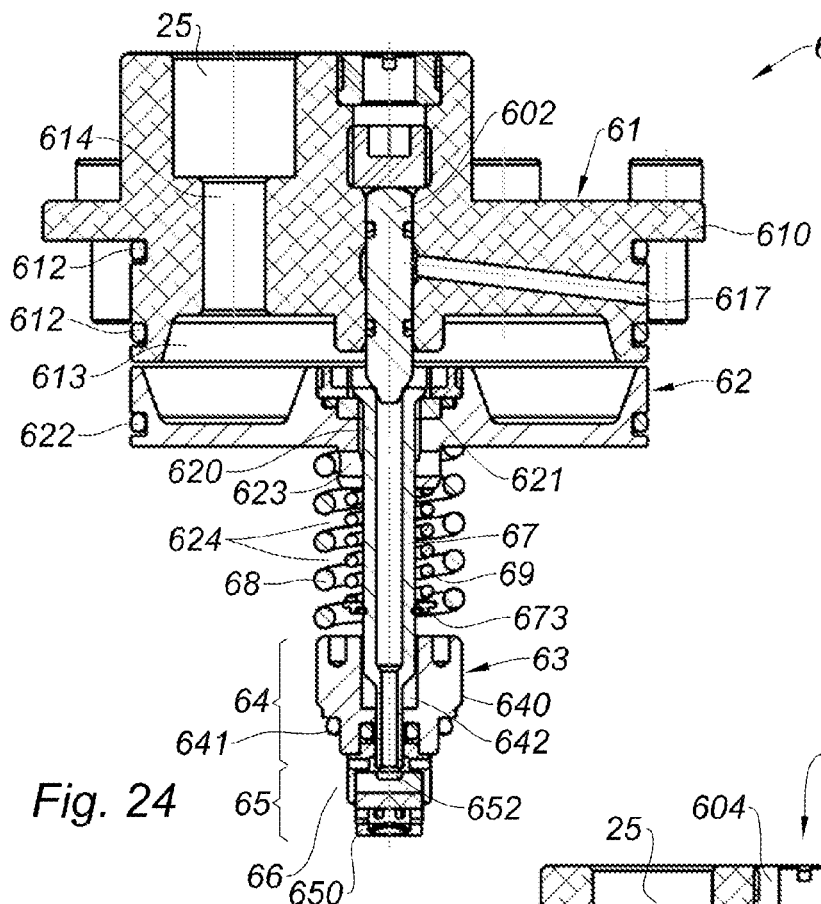
Figure 25:
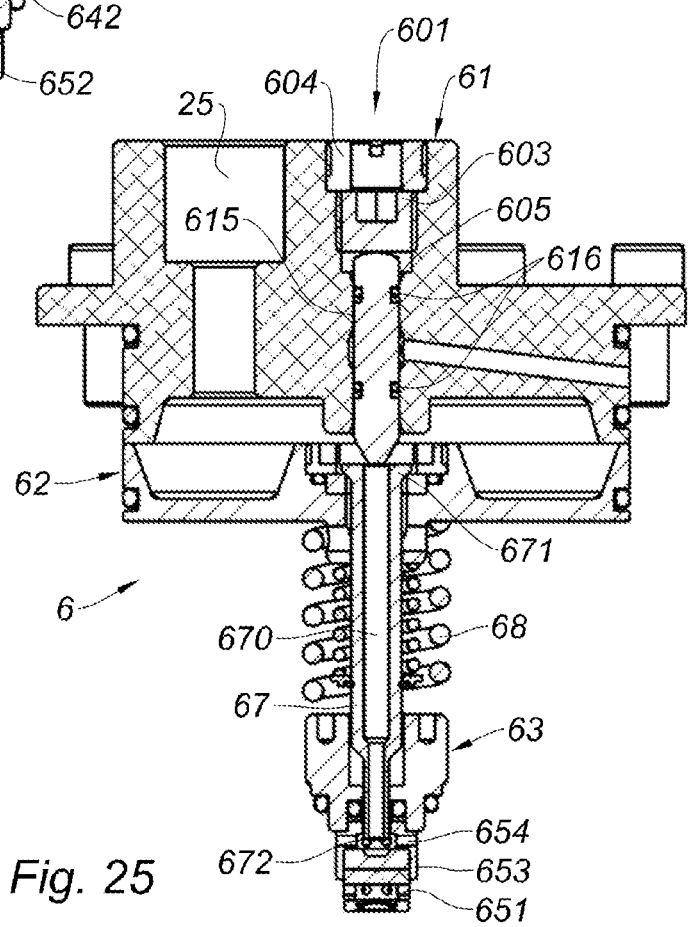
Figure 26:
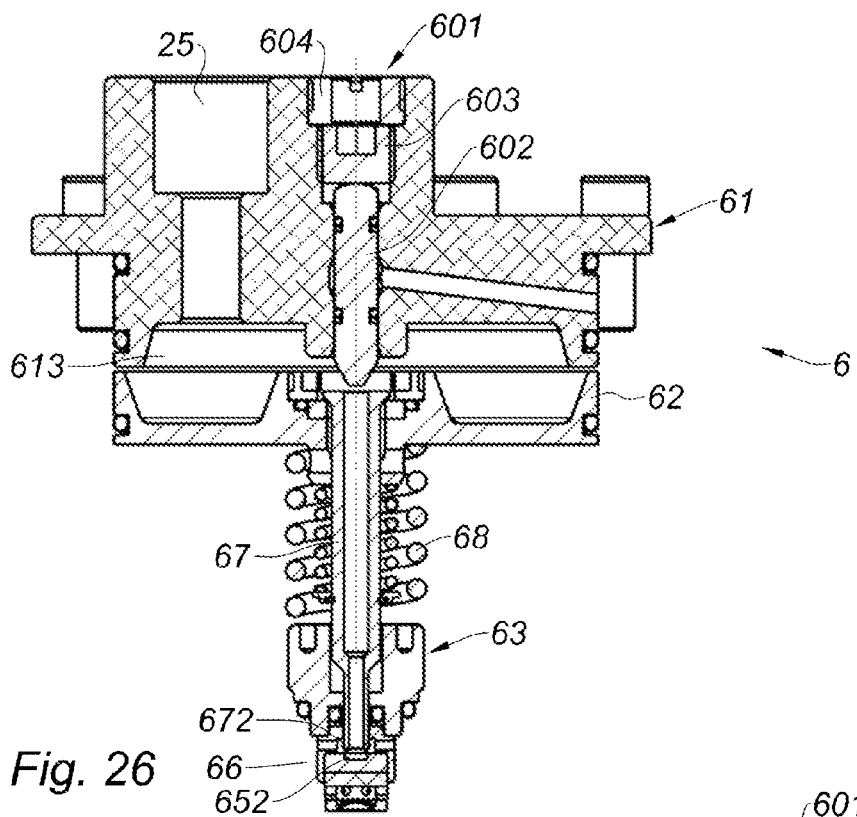
Figure 27:
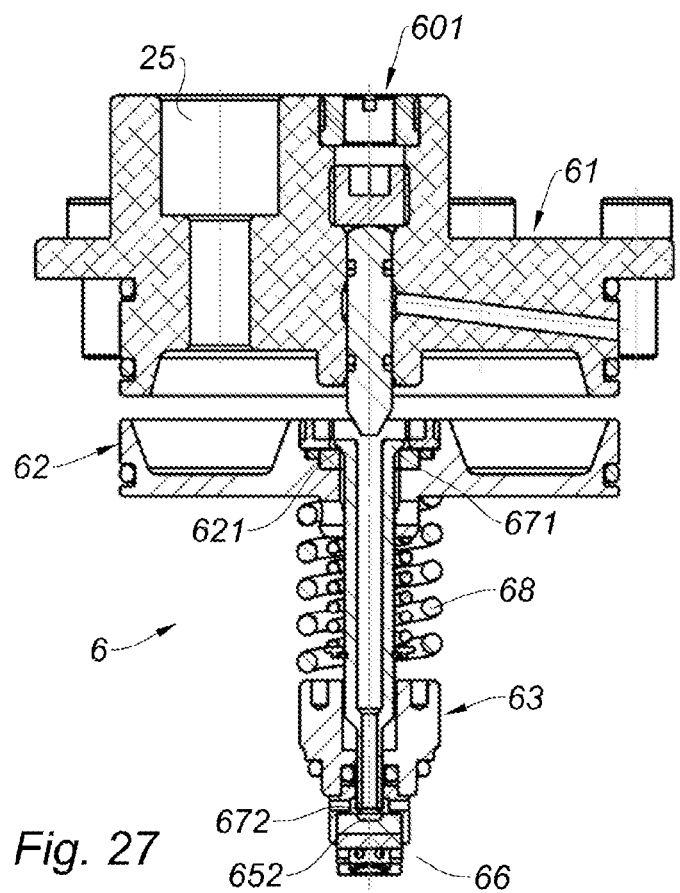
Figure 28:
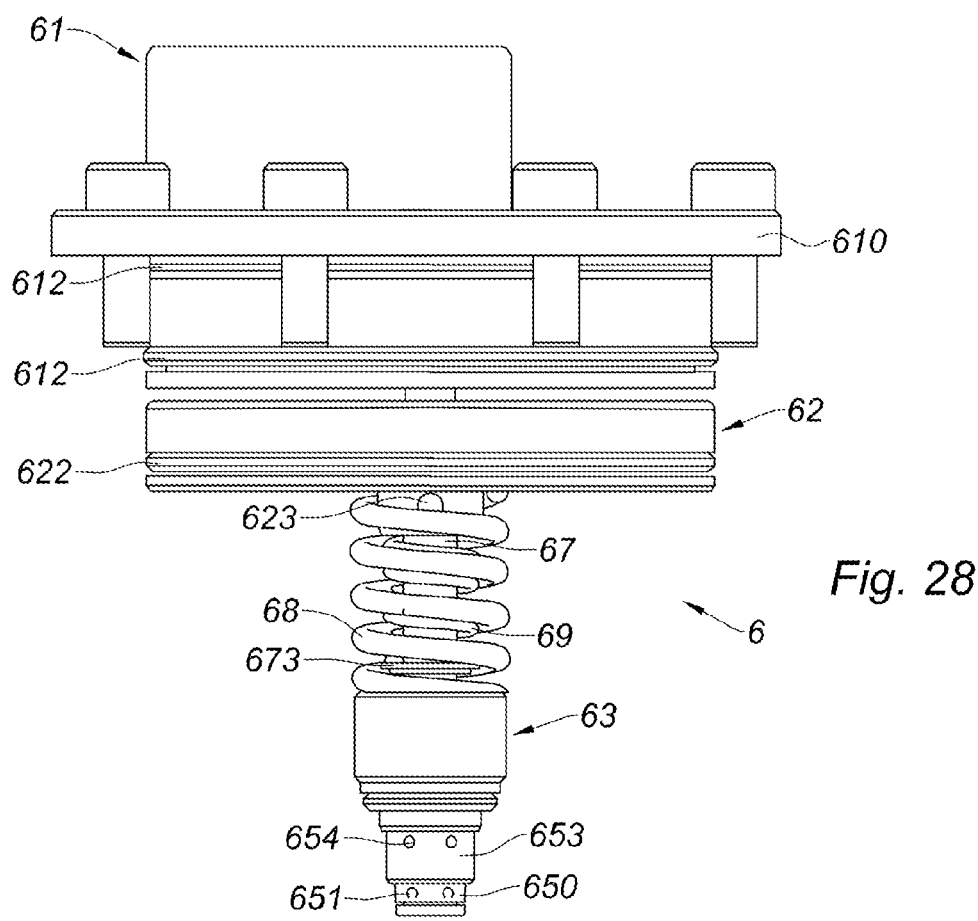
Figure 29:
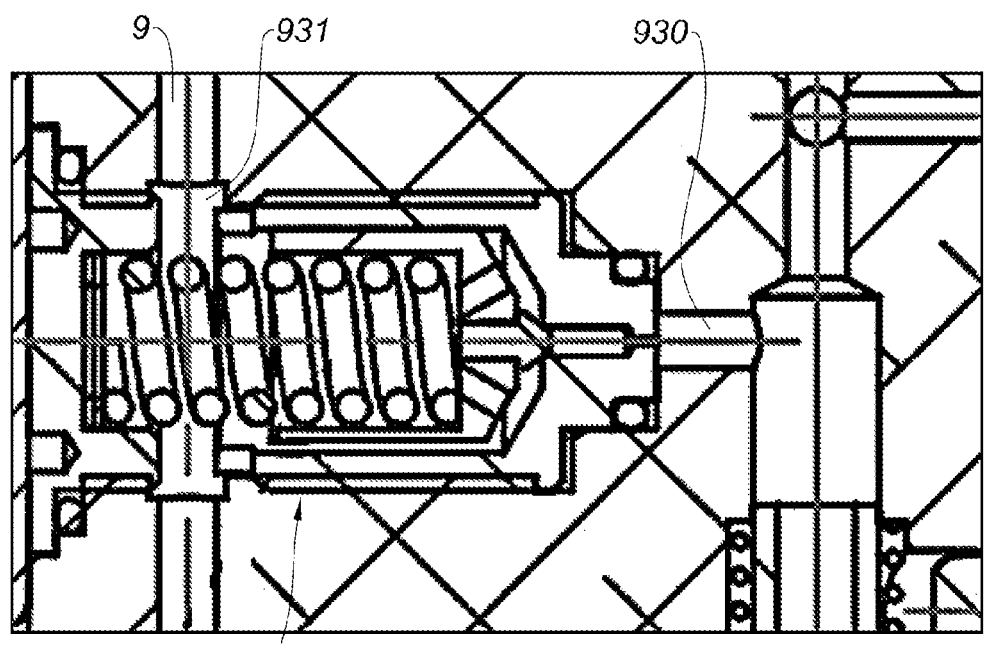
Figure 30:
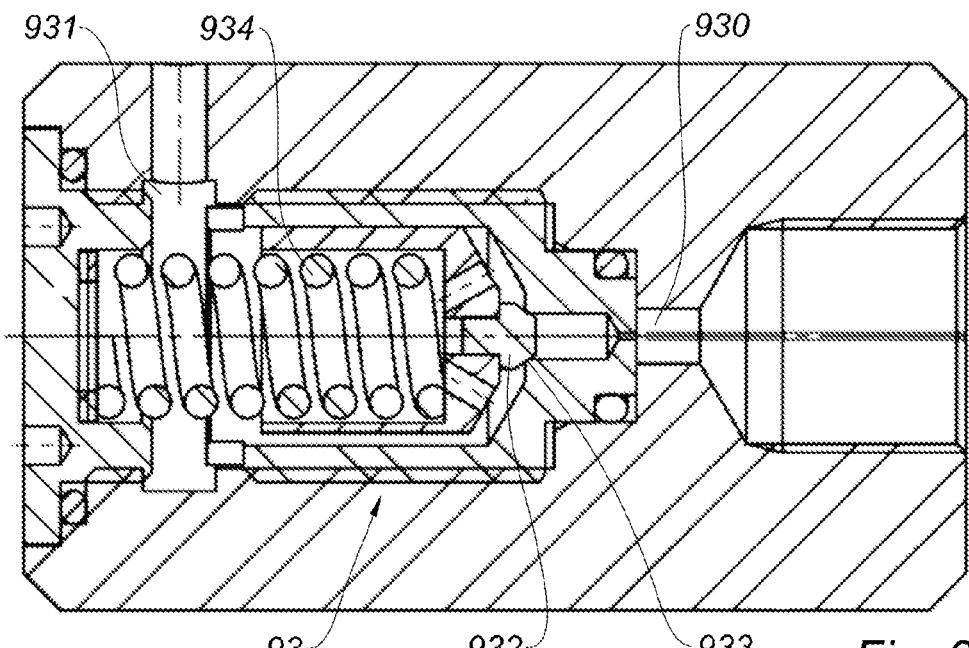
Figure 31:
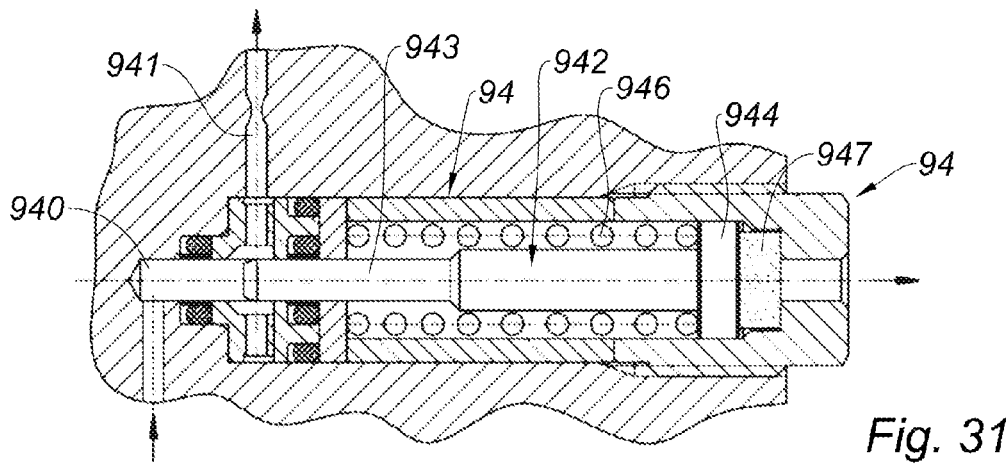
Figure 32:
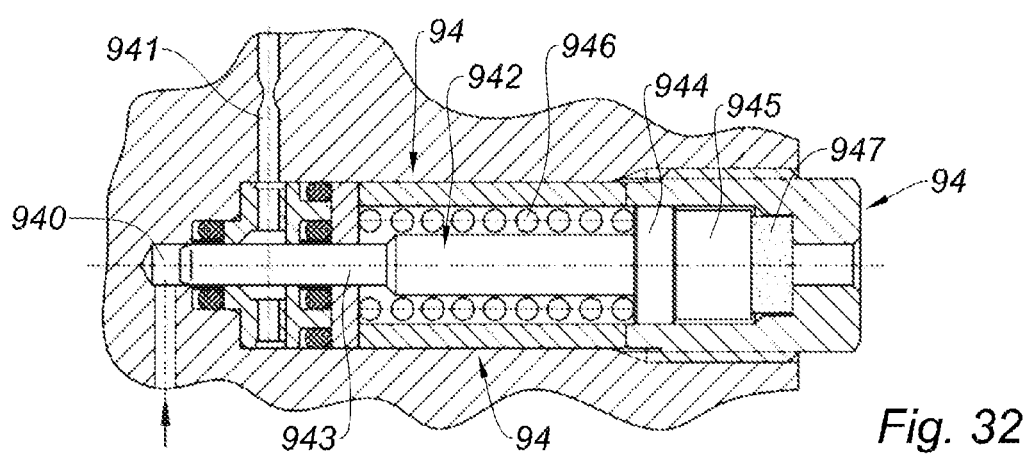

FIGS. 24 to 27 are schematic cross-sectional views of a second pressure regulator in accordance with the present disclosure, or low pressure regulator, of the device of FIGS. 2 to 7, in a locked configuration prohibiting the regulation (FIG. 24), in a configuration unlocked in the first reset phase after raising the shutter finger (FIG. 25), in a configuration unlocked in the second reset phase (FIG. 26), in an open regulating configuration (FIG. 27);

FIG. 28 is a schematic side view of the second pressure regulator of FIGS. 24 and 27;

FIG. 29 is a close up view of part of FIG. 13 schematically illustrating a cross-sectional view of a high pressure safety valve of the device of FIGS. 2 to 7;

FIG. 30 is a schematic cross-sectional view of the high pressure safety valve of FIG. 29, illustrated in a test body;

FIGS. 31 and 32 are schematic cross-sectional views of a high temperature safety valve of the device of FIGS. 2 to 7, illustrated in a test body, in an open configuration above a threshold temperature (FIG. 31) and in a closed configuration below the threshold temperature (FIG. 32).

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A device 1 for filling and withdrawing gas according to the present disclosure comprises a withdrawing circuit 2 comprising an upstream end 21 provided with a storage connector 3 configured for a connection with a storage container RE of a pressurized gas, and a downstream end 22 provided with a withdrawing connector 25 configured for a connection with a withdrawing device (not illustrated) of the gas at reduced pressure.

Between these two ends 21, 22, the withdrawing circuit 2 successively comprises, starting from the upstream end 21, a driven isolation gate 4, a first pressure regulator 5 and a second pressure regulator 6. The withdrawing circuit 2 also comprises, upstream of the driven isolation gate 4, a temperature probe 23 and a pressure probe 24.

The first pressure regulator 5 is associated with, or integrates, a discharging valve 50 disposed downstream between the withdrawing circuit 2 and a leakage circuit 10, wherein the discharging valve 50 is configured for a discharge to the leakage circuit 10 in the event of downstream overpressure, that is to say in the event of the downstream pressure being exceeded beyond a first predefined threshold pressure (also called the adjustment value or calibration value).

In other words, if the downstream pressure exceeds the first threshold pressure, a discharging flap of the discharging valve 50 is raised in opposition to the force of a biasing member, so that the discharging valve 50 opens so that the downstream pressure decreases in the leakage circuit 10 (outlet side). The discharging valve 50 closes as soon as the downstream pressure falls below the first threshold pressure.

The second pressure regulator 6 is associated with, or integrates, a discharging valve 60 disposed downstream between the withdrawing circuit 2 and the leakage circuit 10, wherein the discharging valve 60 is configured for a discharge towards the leakage circuit 10 in the event of a downstream overpressure, that is to say in the event of the downstream pressure being exceeded beyond a second predefined threshold pressure (also called the adjustment value or calibration value).

In other words, if the downstream pressure exceeds the second threshold pressure, a discharging flap of the discharging valve 60 is raised in opposition to the force of a biasing member, so that the discharging valve 60 is opened so that the downstream pressure decreases in the leakage circuit 10 (outlet side). The discharging valve 60 is closed as soon as the downstream pressure falls below the second threshold pressure.

The second pressure regulator 6 is followed by a flow limiter 600 with a safety system 601 with manual reset to close the withdrawing circuit 2 in the event of a drop in downstream pressure.

The device 1 also comprises a filling circuit 7 comprising an upstream end 71 provided with a filling connector 8 configured for a connection with a source of pressurized gas SO for filling the storage container RE, and a downstream end 72 connected at the upstream end 21 of the withdrawing circuit 2.

The device 1 comprises a safety circuit 9 having an upstream end 91 connected to the upstream end 21 of the withdrawing circuit 2; and an upstream end 92 connected to the outside EXT, the upstream end 92 forming a collection point to the outside.

The safety circuit 9 comprises, in parallel, a high pressure safety valve 93, a high temperature safety valve 94 and a drain tap 95 with a flow limiter. One function of the drain tap 95 is to allow controlled emptying of the storage container RE.

The device 1 comprises the leakage circuit 10 having an outlet connected to the outside EXT, and more specifically connected to the upstream end 92 of the safety circuit 9, and inlets connected to various members of the device 1, as described later, and in particular to the discharging valves 50, 60.

The leakage circuit 10 comprises a check valve 11 and a low pressure safety valve 12 having an inlet connected to the downstream end 22 of the withdrawing circuit 2, downstream of the second pressure regulator 6 and also of the flow limiter 600; and an exhaust outlet connected upstream of the check valve 11.

In the described device 1, the safety circuit 9 and the leakage circuit 10 are in communication, and together form one and the same circuit connected to the outside EXT.

The remainder of the description relates to an exemplary form of the device 1, in a compact, light, reliable and secure version.

The device 1 comprises a body 13 in which are formed bores forming channels of the withdrawing circuit 2, the filling circuit 7, the leakage circuit 10 and the safety circuit 9, as well as receiving cavities for the various members of the device 1.

The storage connector 3 comprises a cylindrical connector 30 projecting from one side which is crossed by a main conduit 31 connected to the upstream end 21 of the withdrawing circuit 2, the connector 30 being designed to be connected to the storage container RE so that the gas circulates in the main conduit 31. Of course, the shape of the connector 30 will depend on the connection interface of the storage container RE.

The storage connector 3 also comprises a leakage conduit or duct 32 connected to the leakage circuit 10 and opening between two concentric seals 33, 34; these seals 33, 34 being positioned around the connector 30. Thus, a double sealing barrier is provided between the leakage conduit 32 for improved safety in the event of a leak at the connector 30.

The driven isolation gate 4 comprises a gate 40 controlled by a motor member 41 between a position for closing the withdrawing circuit 2 and a position for opening the withdrawing circuit, with the complementary action of a biasing member 42 which biases the gate 40 towards the closed position in the absence of actuation of the motor member 41.

Figure 20:
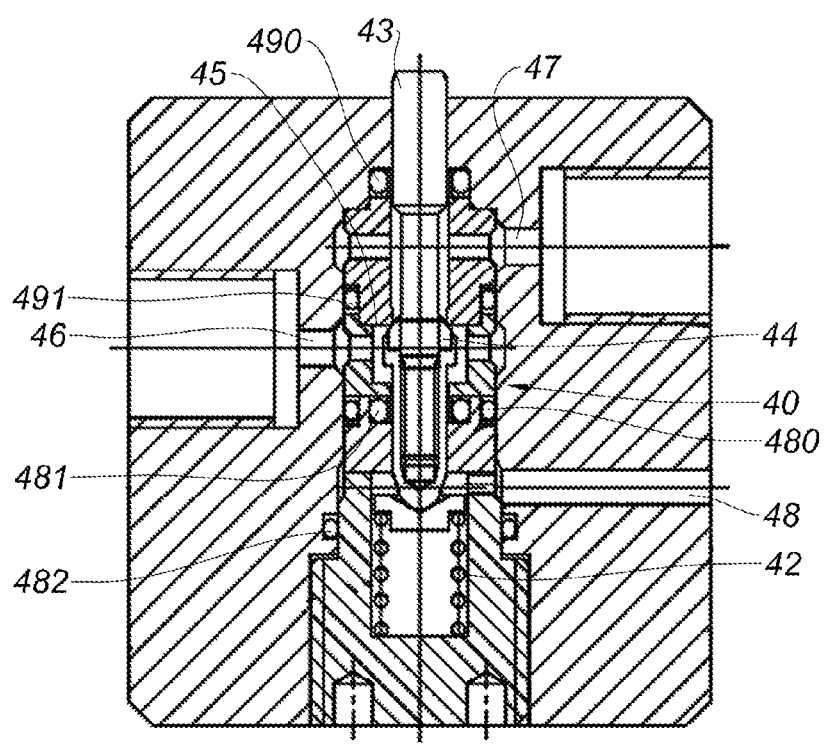
FIG. 20 is a schematic cross-sectional view of a driven isolation gate of the device of FIGS. 2 to 7, illustrated in a test body, without representation of the motorization.

Referring to FIG. 20, the gate 40 comprises a piston 43 displaceable under the action of the motor member 41, the piston 43 having an isolation flap 44 which bears on a seat 45. The motor member 41 controls the displacement of the piston 43 in the direction of a separation of the isolation flap 44 from the seat 45 for an opening of the gate 40 between its inlet 46 and its outlet 47. The biasing member 42, in particular of the helical spring type, for its part exerts a force on the piston 43 to bias it in the direction of a re-compressing of the isolation flap 44 on the seat 45 for closing the gate 40.

The gate 40 integrates a leakage conduit 48 connected to the leakage circuit 10 and disposed upstream of the isolation flap 44, to evacuate towards the leakage circuit 10 any leaks at the level of the bore receiving the gate 40 and also at the level of the movable piston 43. The leakage conduit 48 is framed by seals 480, 481, 482 which allow a double sealing barrier in the management of the leaks.

Figure 11:
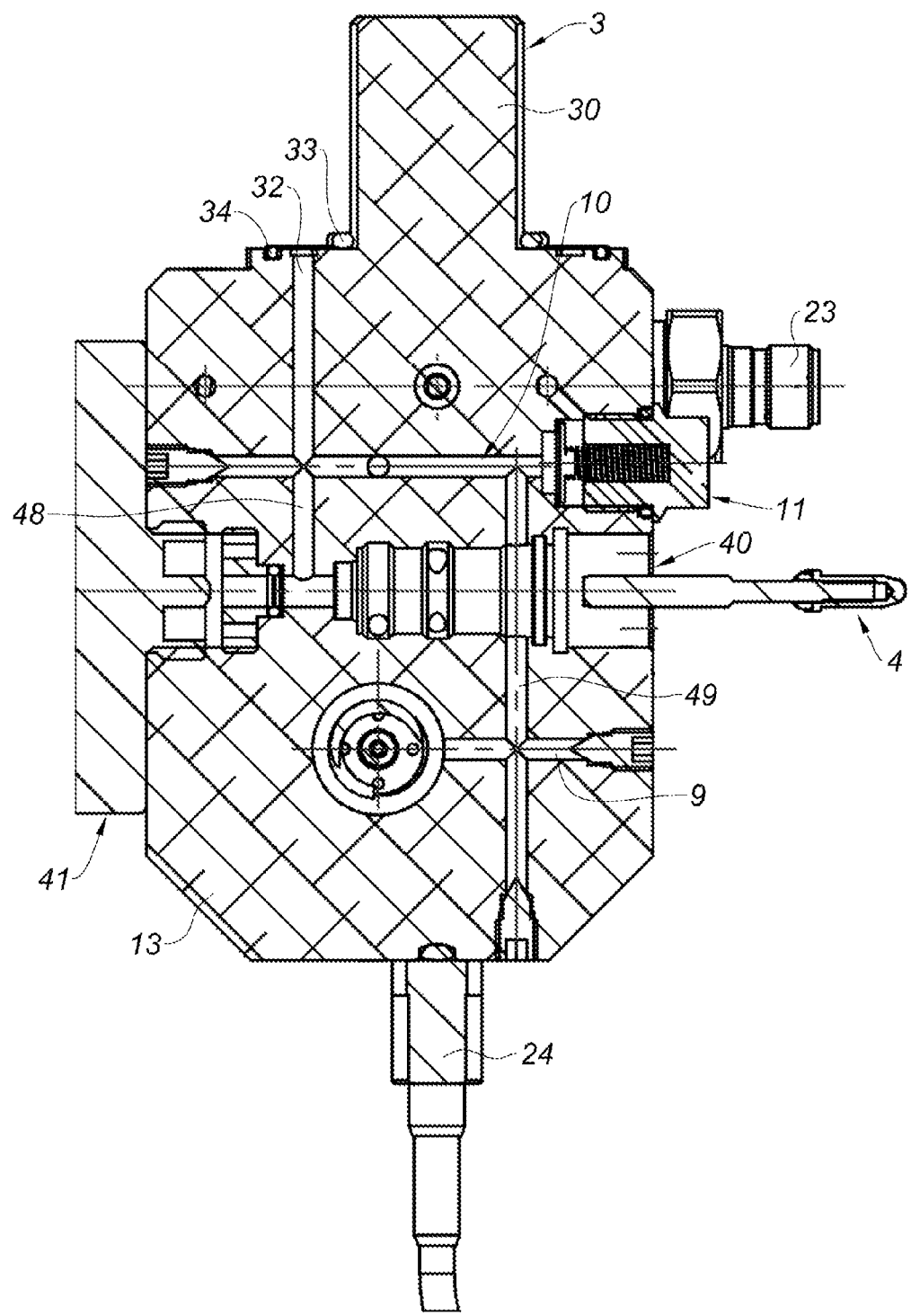
FIG. 11 is a schematic cross-sectional view of the device of FIGS. 2 to 7 along the section plane XI-XI of FIG. 6.
Figure 12:
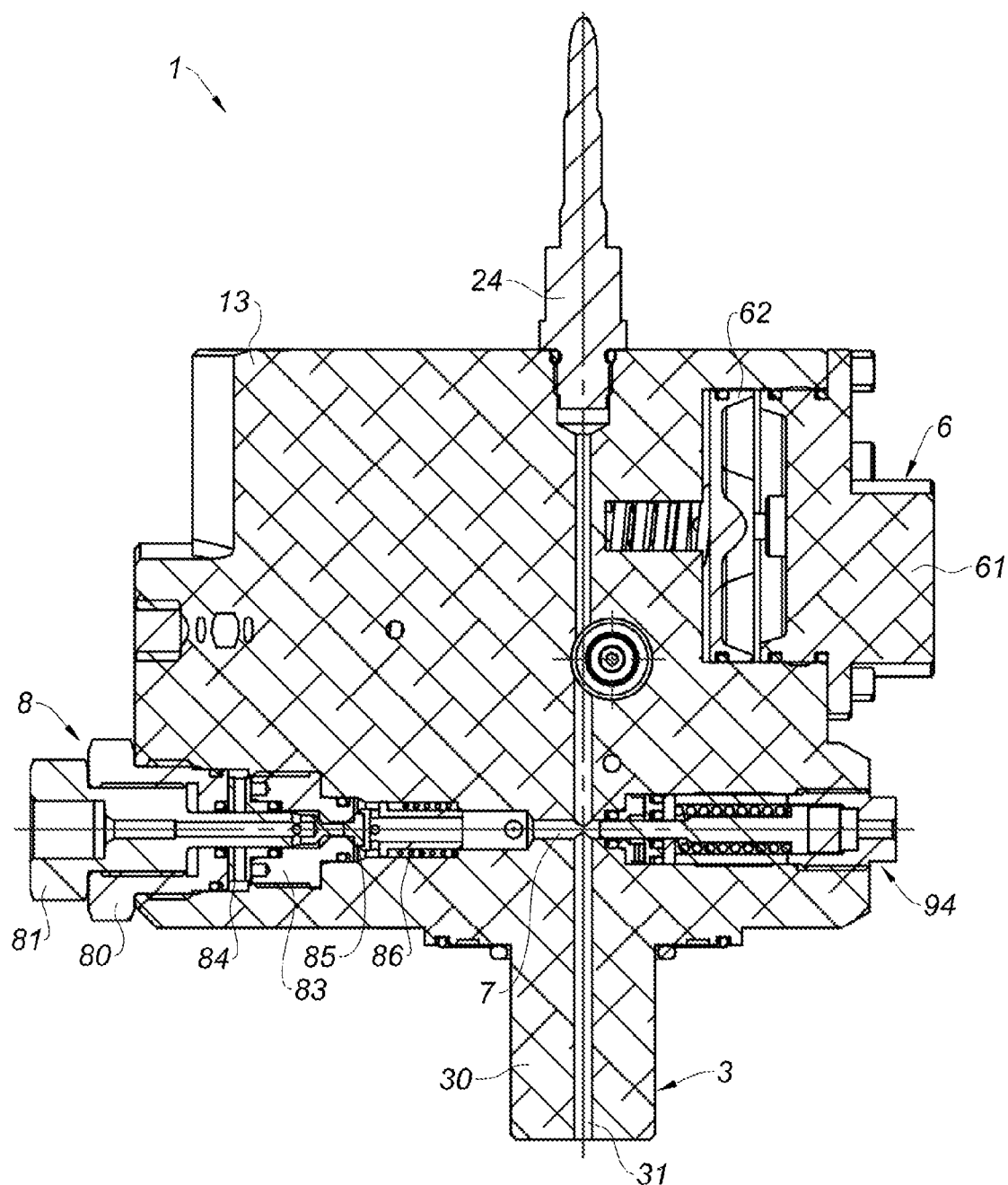
FIG. 12 is a schematic cross-sectional view of the device of FIGS. 2 to 7 along the section plane XII-XII of FIG. 7.

The gate 40 integrates another leakage conduit 49 (visible in FIG. 11) connected to the leakage circuit 10 and disposed downstream of the isolation flap 44, to evacuate towards the leakage circuit 10 any leaks at the level of the bore receiving the gate 40 and also at the level of the movable piston 43. The leakage conduit 49 is framed by seals 490, 491 which allow a double sealing barrier in the management of leaks.

The motor member 41 is mounted in a motor casing 410 fixed to the body 13 and an electrical socket 411 is provided on the outside of the motor casing 410. A wheel 412 is also provided on the outside of the casing 410, wherein the wheel 412 makes it possible to deactivate and remove the motor member 41, so that only the biasing member 42 acts in the direction of closing of the gate 40.

The first pressure regulator 5 is described below with reference to FIGS. 21 to 23, wherein the first pressure regulator 5 is mounted inside a bore whose bottom is in communication with the outlet of the gate 40.

The first pressure regulator 5 comprises a static downstream body 51 forming a cover or plug accessible from the outside and provided with an outer thread 510 for fixing by screwing into the body 13, the downstream body 51 having on an upper face, an upper blind hole 511 for a screwing/unscrewing tool, on the external periphery, two O-ring seals 512 below the outer thread 510, and on a lower face opposite the upper face, a cavity forming a low pressure chamber 513 at the outlet of the first pressure regulator 5, the low pressure chamber 513 being connected to the inlet of the second pressure regulator 6.

Figure 10:
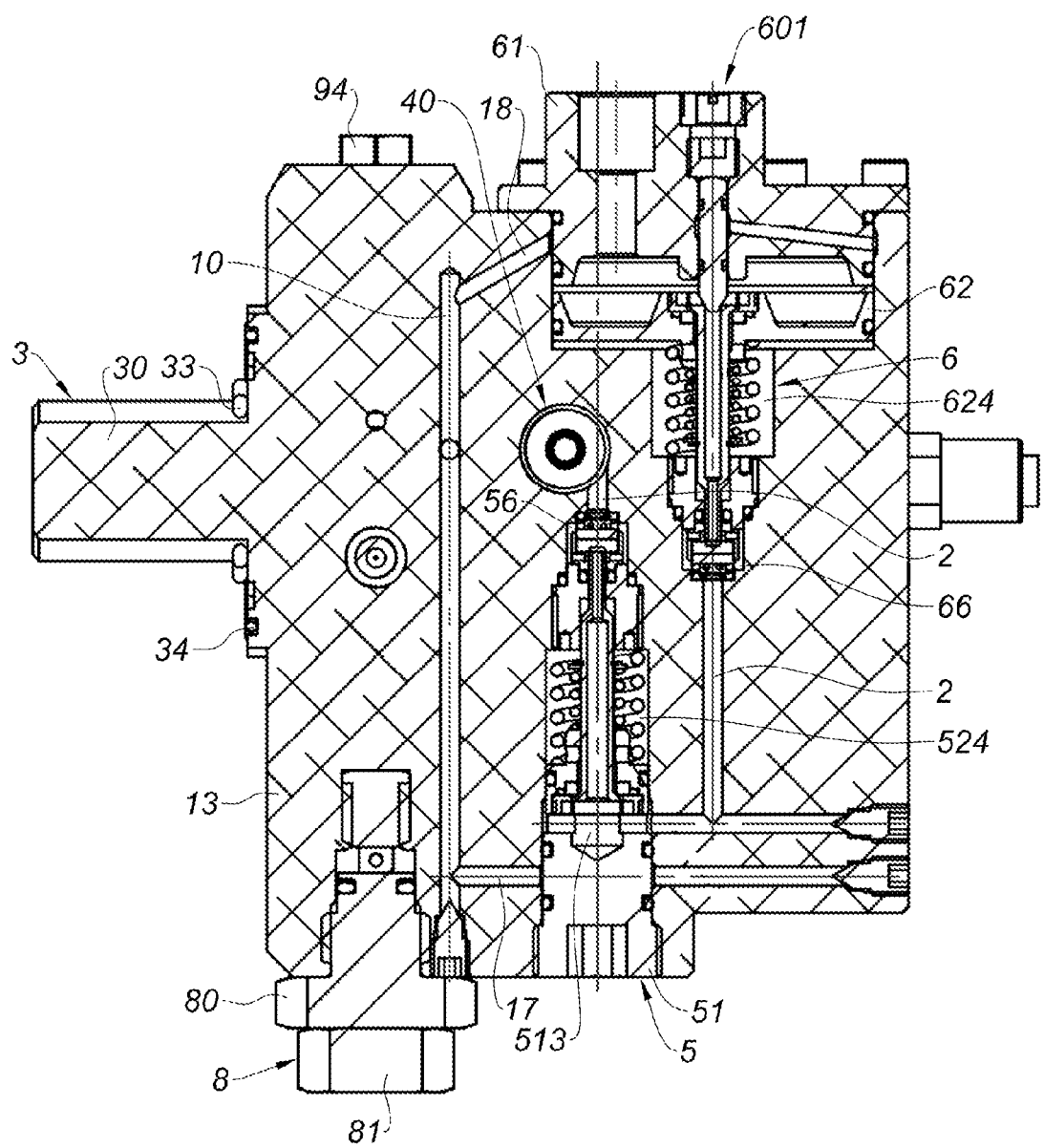
FIG. 10 is a schematic cross-sectional view of the device of FIGS. 2 to 7 along the section plane X-X of FIG. 7.

A leakage conduit or duct 17 (visible in FIG. 10) formed in the body 13 is connected to the leakage circuit 10 and opens into the bore of the first pressure regulator 5 between the two seals 512, again with a double sealing barrier.

The first pressure regulator 5 comprises a regulating part formed of a movable piston 52 shaped to bear on the lower face of the downstream body 51, the piston 52 being provided at the external periphery with an O-ring seal 522 and having an inner channel 520 passing through and having an upper end, on the side of the downstream body 51, facing the low pressure chamber 513 and forming a discharging seat 521, and an opposite lower end 523 which opens onto an intermediate chamber 524.

Figure 17:
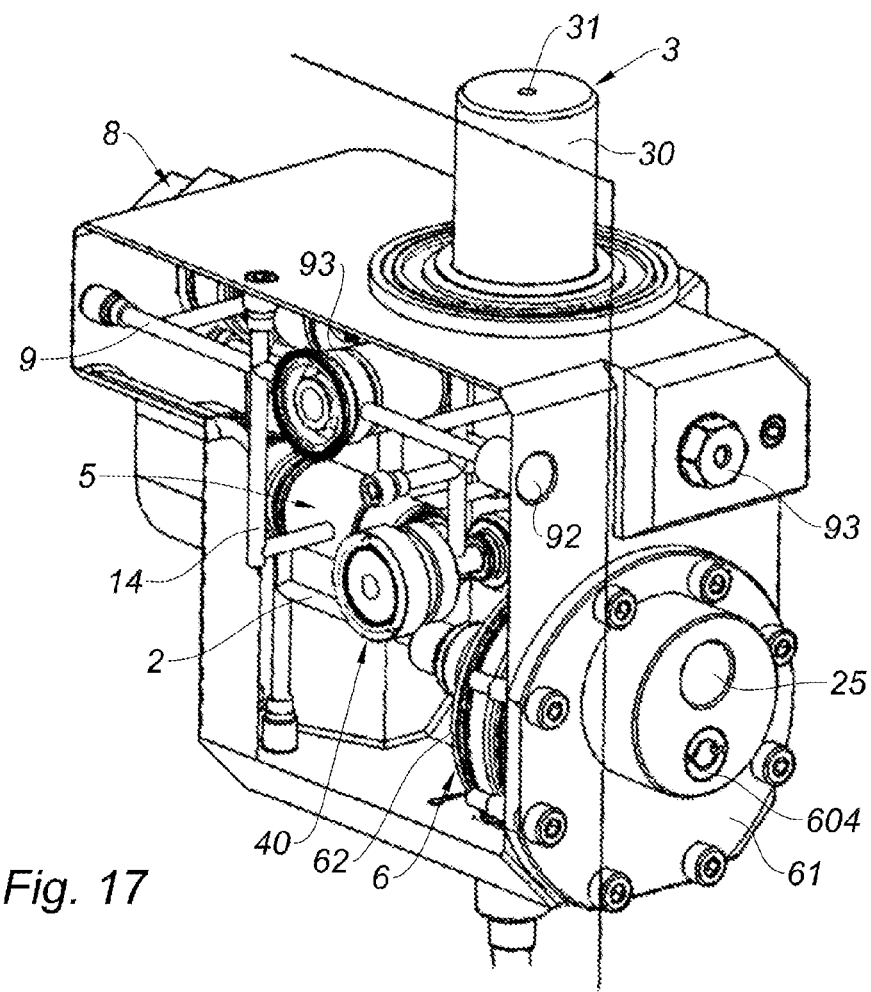
Figure 18:
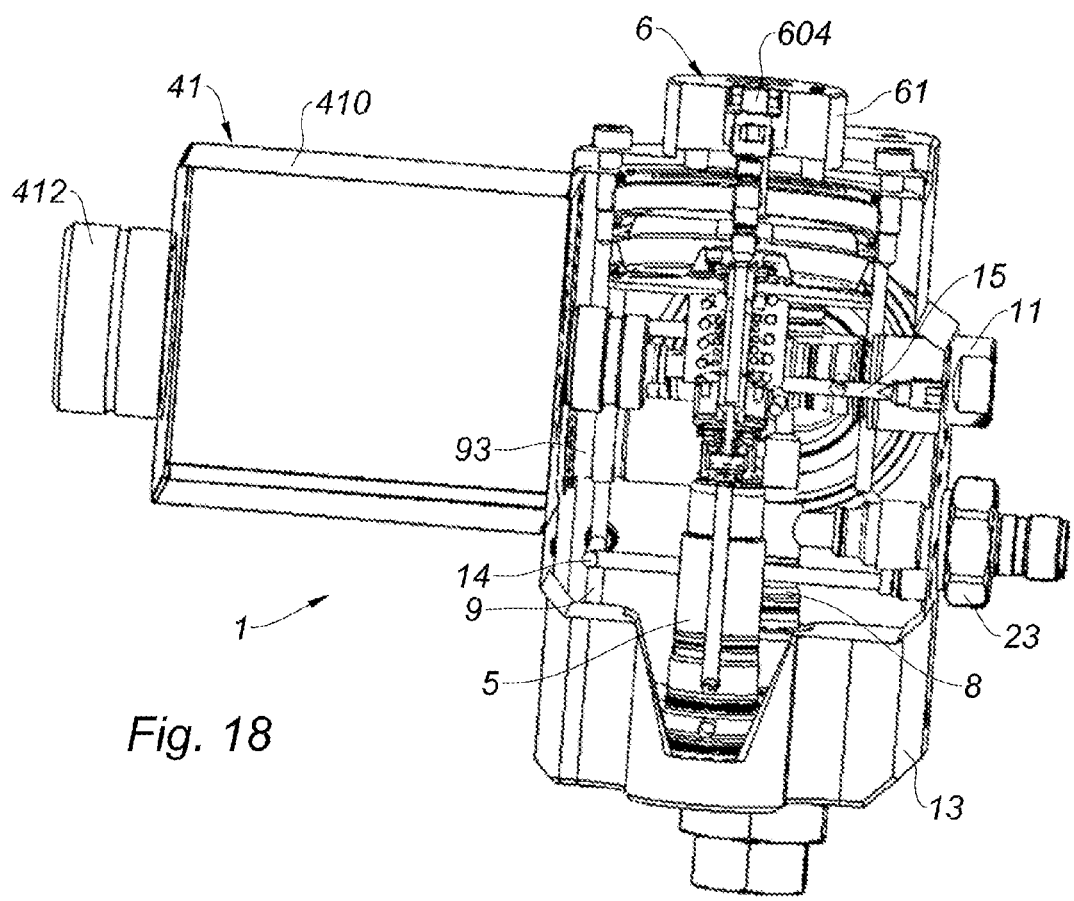

The first pressure regulator 5 comprises a static upstream body 53 having an upper portion 54 extended by a lower portion 55, wherein the upper portion 54 faces the piston 52 so that the intermediate chamber 524 is delimited between the piston 52 and the upper portion 54 of the upstream body 53. The intermediate chamber 524 is connected to the leakage circuit 10 or to the safety circuit 9, via a discharging conduit or duct 14 formed in the body 13 and visible in FIGS. 17 and 18.

The upper portion 54 is provided with an outer thread 540 for fixing by screwing in the body 13, and more specifically for fixing to the bottom of the corresponding bore, until the upper portion 54 abuts on an inner shoulder of the bore via a seal 541.

The upstream body 53 defines with the bottom of the bore, under the inner shoulder, a high pressure chamber 56 at the inlet of the first pressure regulator 5, the high pressure chamber 56 being connected to the outlet of the gate 40.

The upper portion 54 has an inner channel 542 passing through and having an upper end which opens onto the intermediate chamber 524 and a lower end which opens onto the high pressure chamber 56.

The lower portion 55 has a lower dome 550 bearing on the bottom of the bore for an inlet EN of the high pressure gas, wherein the lower dome 550 is provided with lateral holes 551 opening into the high pressure chamber 56.

The lower dome 550 has an upper face facing the lower end of the inner channel 542, and a cavity is formed in the upper face to form an expansion seat 552.

The lower portion 55 comprises a cylindrical wall 553 which surrounds the upper face of the lower dome 550, wherein the cylindrical wall 553 is provided with lateral holes 554 opening into the high pressure chamber 56.

Thus, at the inlet, the gas enters inside the lower dome 550 as shown diagrammatically by the arrow EN in FIG. 21, then the gas leaves the high pressure chamber 56 through the lateral holes 551 and enters at the level of the expansion seat 552 through the lateral holes 554 as shown diagrammatically by the arrow CH in FIG. 21. The gas flow advantageously participates in the desired gas expansion function.

The first pressure regulator 5 comprises a tubular valve rod 57 provided with an inner channel 570, the valve rod 57 passing through both the inner channel 520 of the piston 52 and the inner channel 542 of the upper portion 54 of the upstream body 53, so that the valve rod 57 has a flared upper end forming a discharging flap 571 suitable for bearing on the discharging seat 521 (in other words on the upper end of the inner channel 520); and a lower end forming a regulating flap 572 suitable for bearing on the expansion seat 552.

The regulating flap 572 is movable relative to the expansion seat 552 between an upstream position for closing the communication between the low pressure chamber 513 and the high pressure chamber 56 (via the inner channel 570), wherein the regulating flap 572 is in abutment on the expansion seat 552; and a downstream position for opening the communication between the low pressure chamber 513 and the high pressure chamber 56 (via the inner channel 570), wherein the regulating flap 572 is detached from the expansion seat 552.

The discharging flap 571 is movable relative to the discharging seat 521 between an upstream position for closing the communication between the low pressure chamber 513 and the intermediate chamber 524 (via the inner channel 520), wherein the discharging flap 571 is in abutment on the discharging seat 521; and a downstream position for opening the communication between the low pressure chamber 513 and the intermediate chamber 524 (via the inner channel 520), wherein the discharging flap 571 is detached from the discharging seat 521.

The first pressure regulator 5 also comprises a first biasing member 58, in this case a helical spring, compressed between the piston 52 and the upstream body 53 and biasing the piston 52 in the direction of the downstream body 51 (in other words in the direction of pressing of the piston 52 against the downstream body 51).

The first pressure regulator 5 also comprises a second biasing member 59, in this case a helical spring, compressed between the piston 52 and a plate 573 secured to the valve rod 57. The second biasing member 59 extends to the interior of the first biasing member 58, and the plate 573 may for example be formed of a circlip tightened around the valve rod 57. The second biasing member 59 biases the valve rod 57, relative to the piston 52, in the direction of a pressing of the discharging flap 571 against the discharging seat 521, in other words in the direction of the discharging flap 571 towards the upstream closed position.

The following description relates to the operation of the first pressure regulator 5.

With reference to FIG. 21, in a rest configuration, that is to say in the absence of pressure at the inlet (gate 40 closed) and at the outlet of the first pressure regulator 5, the piston 52 is in abutment on the lower face of the downstream body 51 under the action of the first biasing member 58, the discharging flap 571 is in the upstream closed position under the action of the second biasing member 59, and the regulating flap 572 is in the downstream open position, so that the first pressure regulator 5 is open.

With reference to FIG. 21, in a regulating configuration, that is to say with the presence of a high pressure at the inlet (gate 40 open) to be regulated to deliver a reduced pressure at the outlet, the regulating flap 572 is in the downstream opening position and the expansion takes place at the expansion seat 552, the gas passing through the inner channel 570 of the valve rod 57 to reach the low pressure chamber 513; the pressure in the low pressure chamber 513 acts on the piston 52 in the direction of separation from the downstream body 51, so that the regulation is established in the first pressure regulator 5; and the discharging flap 571 is in the upstream closed position under the action of the second biasing member 59.

Referring to FIG. 22, in a closed discharging configuration in the event of an overpressure in the low pressure chamber 513, that is to say in the case where the downstream pressure (or pressure in the low pressure chamber 513) exceeds a first predefined threshold pressure (which depends on the gas bearing surfaces and the spring coefficients of the biasing members 58, 59), the overpressure in the low pressure chamber 513 acts on the piston 52 in the direction of a separation from the downstream body 51 sufficient for the regulating flap 572 to be in the upstream closed position, under the effect of the second biasing member 59 which pushes the valve rod 57; the valve rod 57 being in abutment on the expansion seat 552 and the piston 52 being sufficiently spaced from the downstream body 51, the discharging flap 571 takes off from the discharging seat 521 and thus passes into the downstream open position, allowing the communication between the low pressure chamber 513 and the discharging conduit 14 connected to the leakage circuit 10, and thus the discharge takes place in the leakage circuit 10 and the downstream pressure is released.

Figure 1:
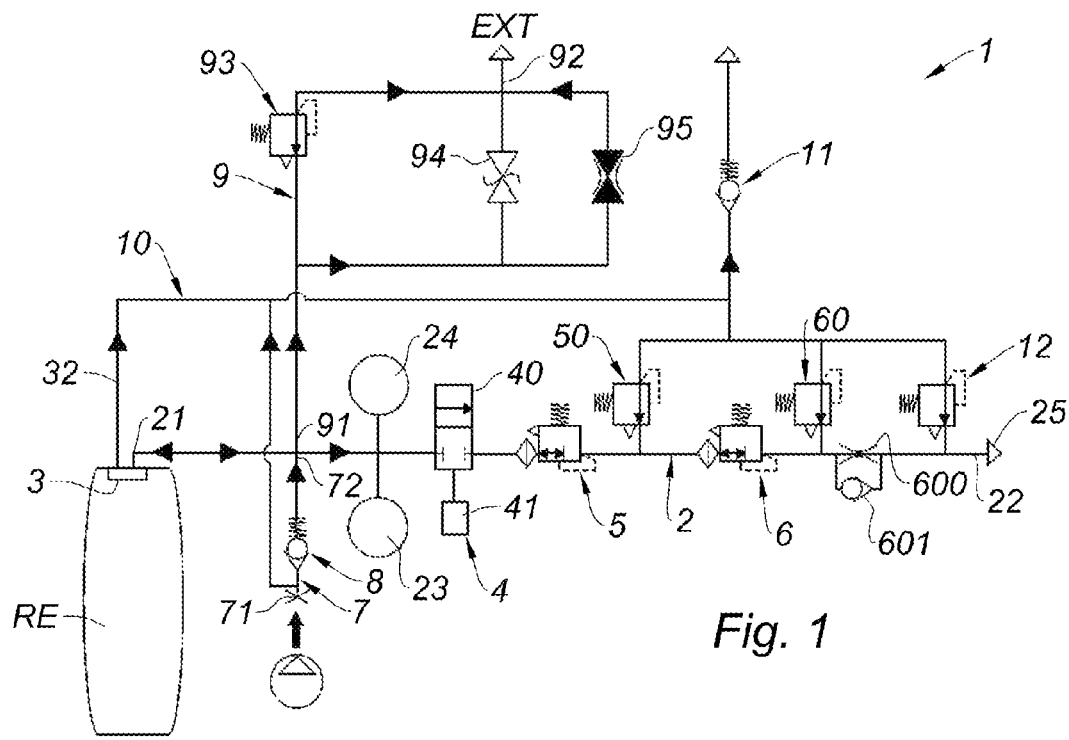
FIG. 1 is a schematic view illustrating the structure of one form of a filling and withdrawing device according to the present disclosure.
Figure 2:
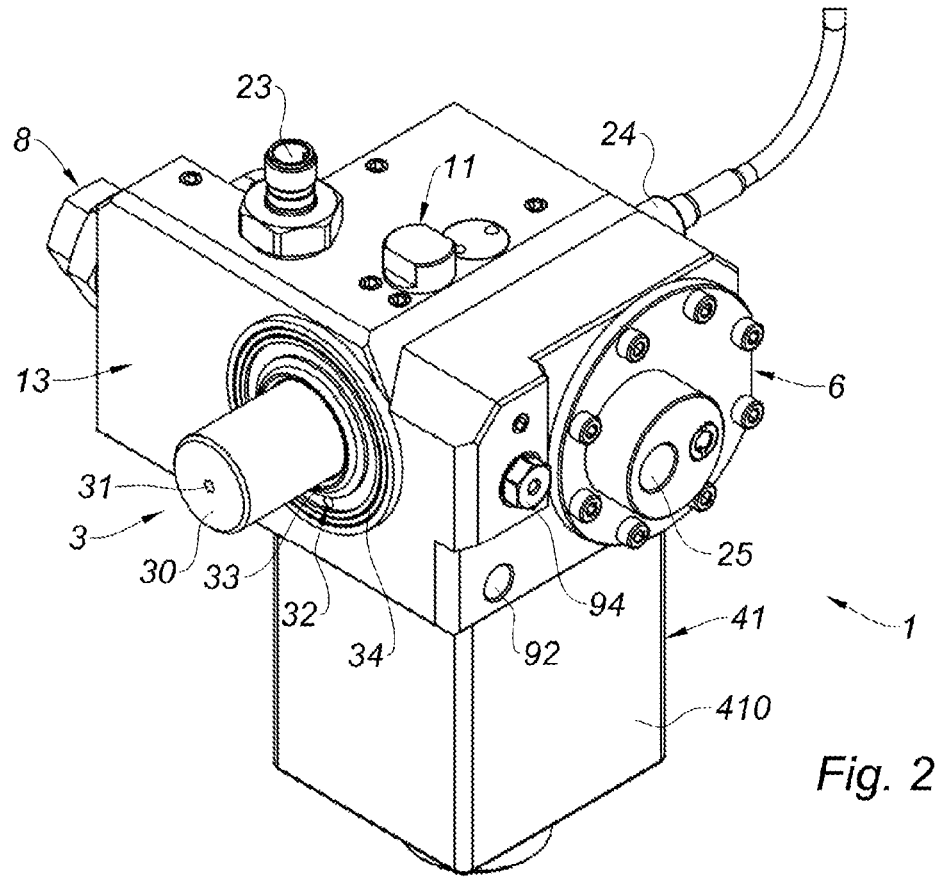
FIGS. 2 to 5 are schematic perspective views and from different viewing angles of a filling and withdrawing device according to the present disclosure.
Figure 3:
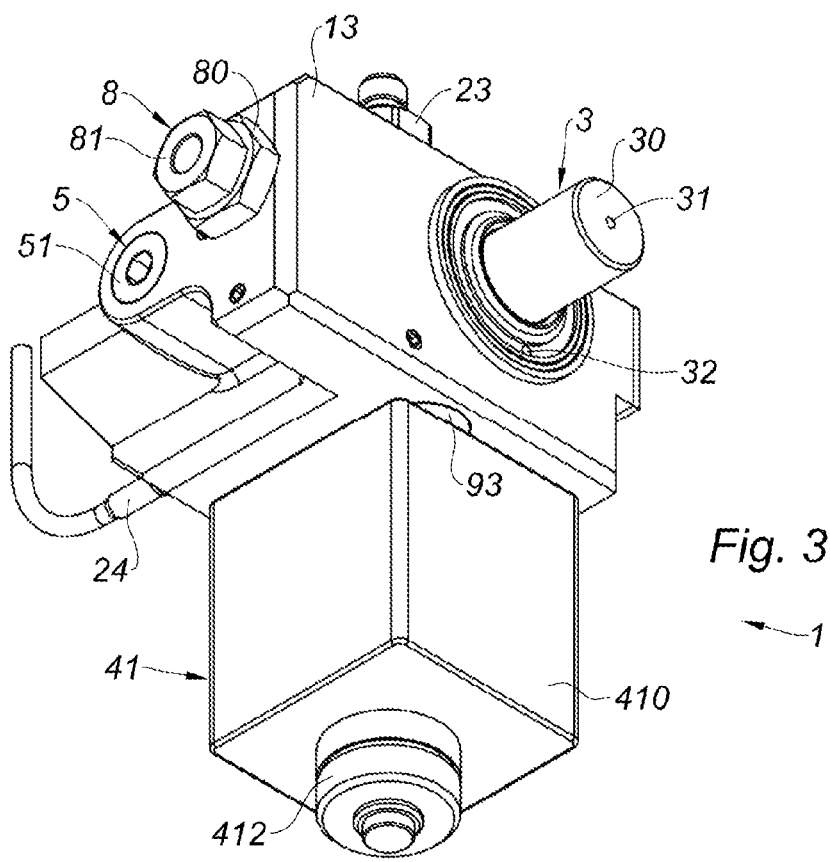
Figure 4:
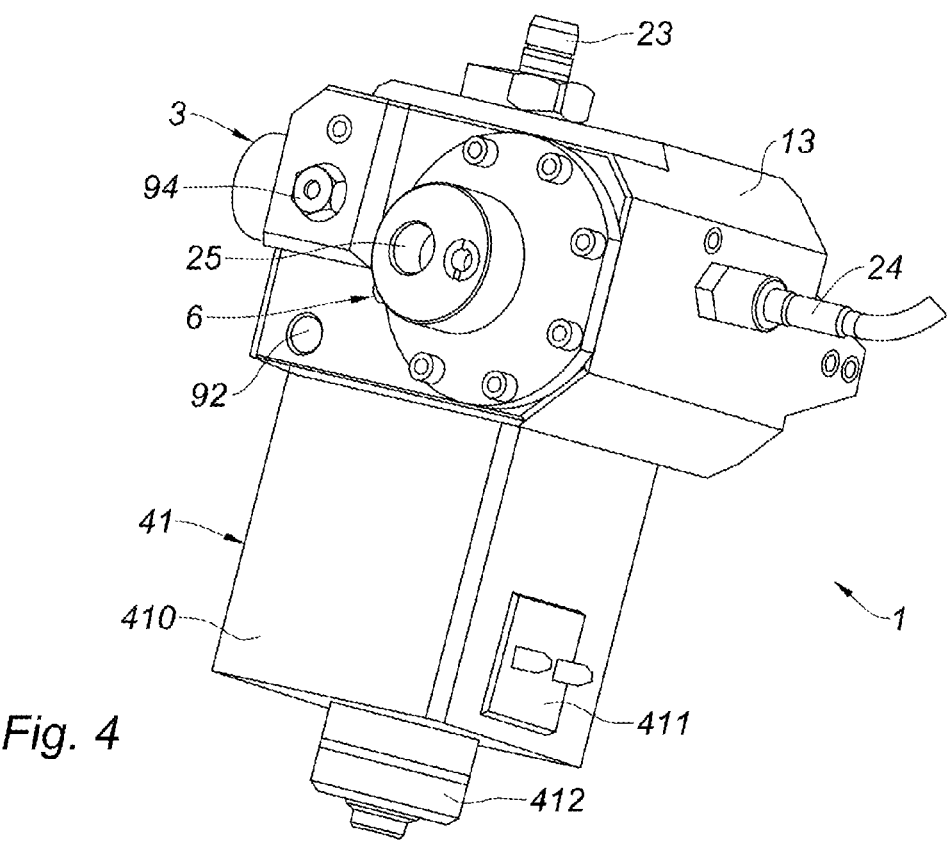
Figure 5:
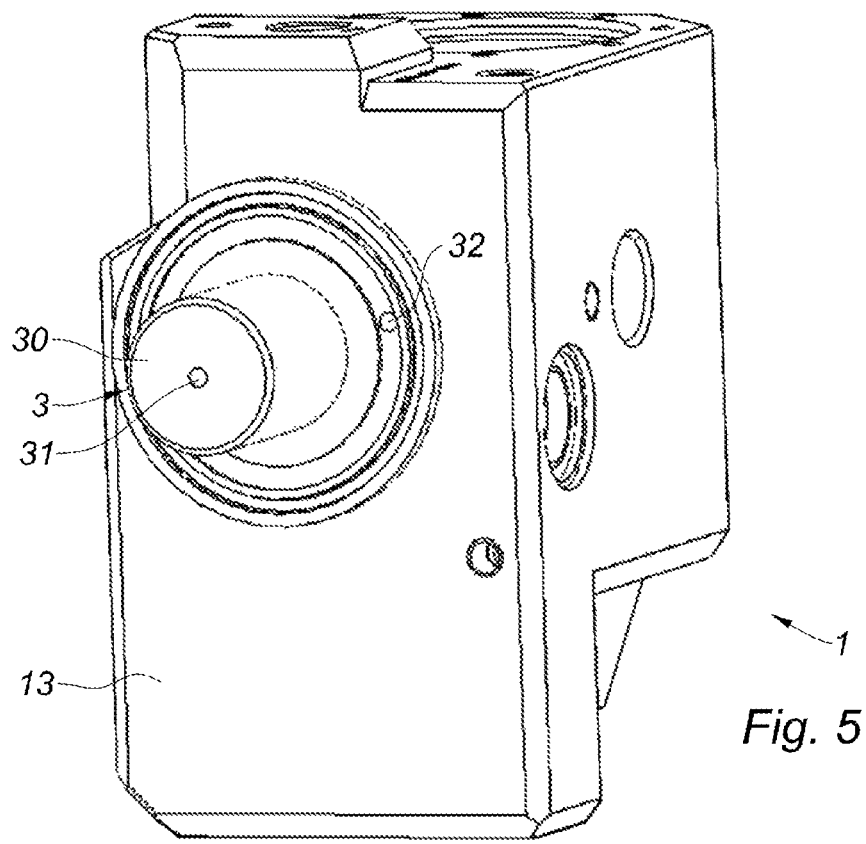
Figure 6:
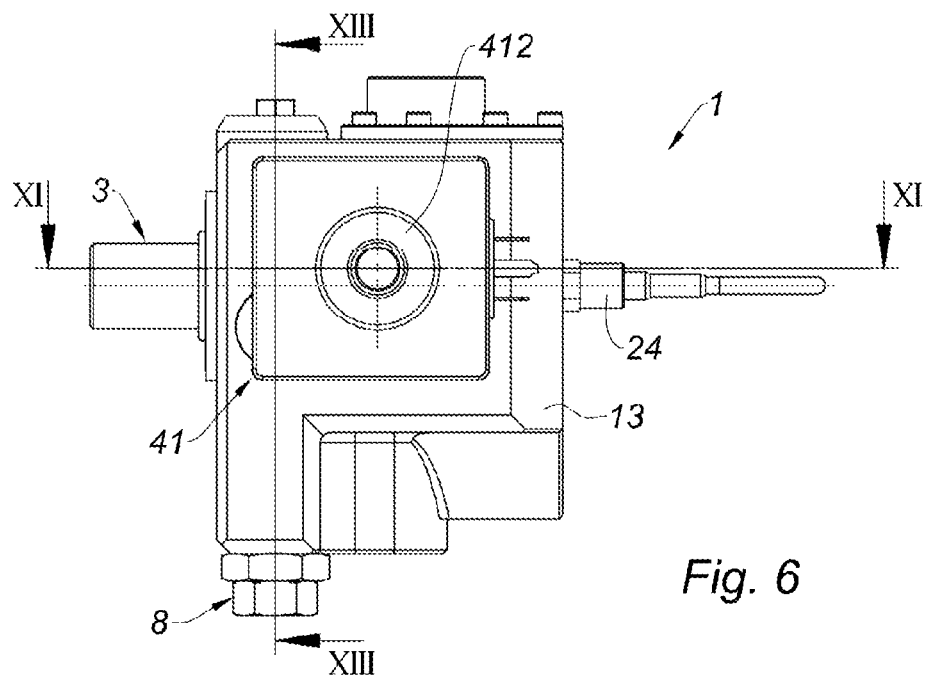
FIGS. 6 and 7 are schematic side views of the device of FIGS. 2 to 5.
Figure 7:
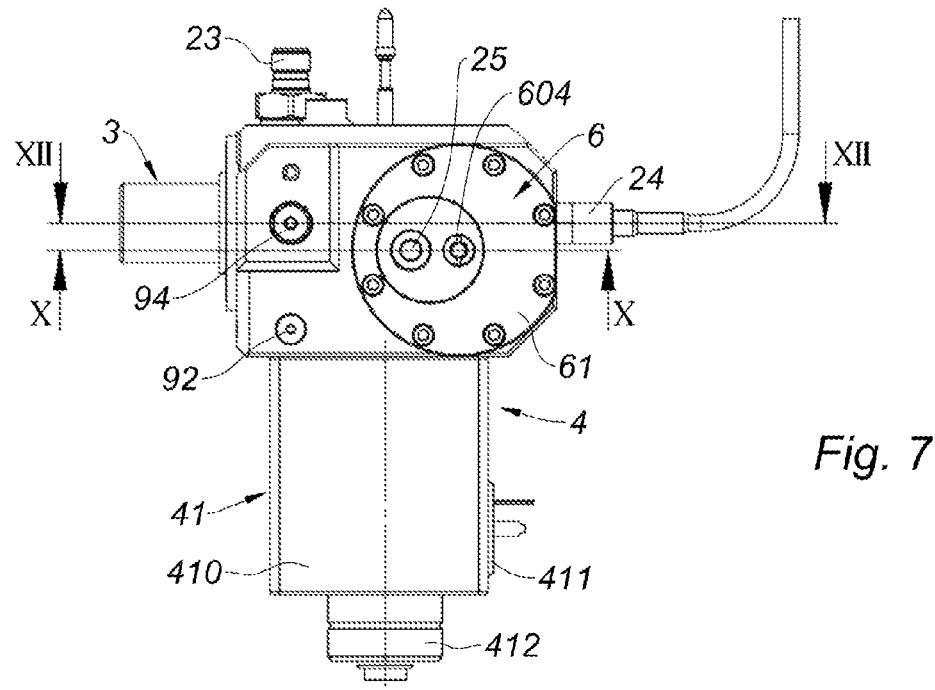

In the first pressure regulator 5, the discharging flap 571 and the second biasing member 59 together form the discharging valve 50 mentioned previously with reference to FIG. 1.

The second pressure regulator 6 is described below with reference to FIGS. 24 to 28, wherein the second pressure regulator 6 is mounted inside a bore whose bottom is in communication with the outlet of the first pressure regulator 5.

The second pressure regulator 6 comprises a static downstream body 61 forming a cover or plug accessible from the outside and provided with a peripheral bearing 610 for fixing by means of several screws on the body 13, the downstream body 61 having on the outer periphery, two O-ring seals 612 below the peripheral bearing 610, on an upper (or outer) face, a threaded orifice forming the withdrawing connector 25 (female connector) to the downstream end 22 of the withdrawing circuit 2; and on a lower face opposite the upper face, a cavity forming a low pressure chamber 613 at the outlet of the second pressure regulator 6, the low pressure chamber 613 being connected to the withdrawing connector 25 via an internal conduit 614.

A leakage conduit or duct 18 (visible in FIG. 10) formed in the body 13 is connected to the leakage circuit 10 and opens into the bore of the second pressure regulator 6 between the two seals 612, again with a double sealing barrier.

The second pressure regulator 6 comprises a regulating part formed of a movable piston 62 shaped to bear on the lower face of the downstream body 61, the piston 62 being provided at the outer periphery with an O-ring seal 622 and having an inner channel 620 passing through and having an upper end, on the side of the downstream body 61, facing the low pressure chamber 613 and forming a discharging seat 621, and an opposite lower end 623 which opens onto an intermediate chamber 624.

Figure 16:
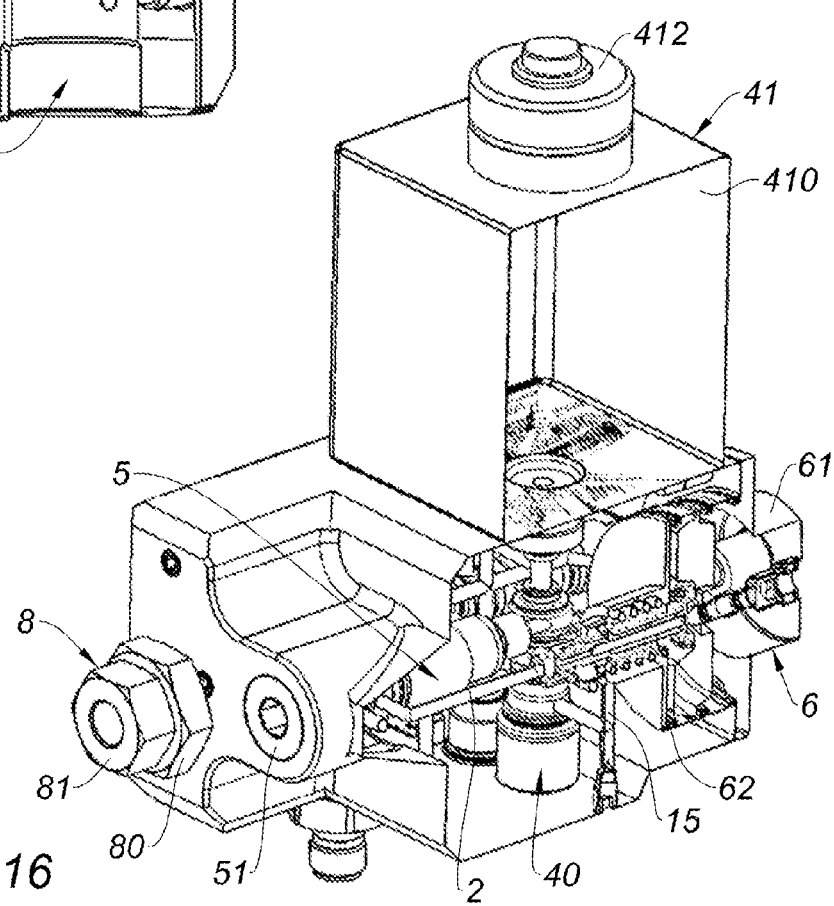

The second pressure regulator 6 comprises a static upstream body 63 having an upper portion 64 extended by a lower portion 65, wherein the upper portion 64 faces the piston 62 so that the intermediate chamber 624 is delimited between the piston 62 and the upper portion 64 of the upstream body 63. The intermediate chamber 624 is connected to the leakage circuit 10 or to the safety circuit 9, via a discharging conduit or duct 15 formed in the body 13 and visible in FIGS. 16 and 18.

The upper portion 64 is provided with an outer thread 640 for a fixing by screwing in the body 13, and more specifically for a fixing to the bottom of the corresponding bore, until the upper portion 64 abuts on an inner shoulder of the bore via a seal 641.

The upstream body 63 delimits with the bottom of the bore, under the inner shoulder, a high pressure chamber 66 at the inlet of the second pressure regulator 6, the high pressure chamber 66 being connected to the outlet of the first pressure regulator 5, in other words to the low pressure chamber 513 of the first pressure regulator 5.

The upper portion 64 has an inner channel 642 passing through and having an upper end which opens onto the intermediate chamber 624 and a lower end which opens into the high pressure chamber 66.

The lower portion 65 has a lower dome 650 bearing on the bottom of the bore for an inlet EN of the high pressure gas, wherein the lower dome 650 is provided with lateral holes 651 opening into the high pressure chamber 66.

The lower dome 650 has an upper face facing the lower end of the inner channel 642, and a cavity is formed in the upper face to form an expansion seat 652.

The lower portion 65 comprises a cylindrical wall 653 which surrounds the upper face of the lower dome 650, wherein the cylindrical wall 653 is provided with lateral holes 654 opening into the high pressure chamber 66.

Thus, at the inlet, the gas enters the interior of the lower dome 650, then the gas leaves the high pressure chamber 66 through the lateral holes 651 and enters at the level of the expansion seat 652 through the lateral holes 654. The gas path advantageously participates in the desired gas expansion function.

The second pressure regulator 6 comprises a tubular valve rod 67 provided with an inner channel 670, the valve rod 67 passing through both the inner channel 620 of the piston 62 and the inner channel 642 of the upper portion 64 of the upstream body 63, so that the valve rod 67 has a flared upper end forming a discharging flap 671 suitable for bearing on the discharging seat 621 (in other words on the upper end of the inner channel 620); and a lower end forming a regulating flap 672 suitable for bearing on the expansion seat 652.

The regulating flap 672 is movable relative to the expansion seat 652 between an upstream position for closing the communication between the low pressure chamber 613 and the high pressure chamber 66 (via the inner channel 670), wherein the regulating flap 672 is in abutment on the expansion seat 652; and a downstream position for opening the communication between the low pressure chamber 613 and the high pressure chamber 66 (via the inner channel 670), wherein the regulating flap 672 is detached from the expansion seat 652.

The discharging flap 671 is movable relative to the discharging seat 621 between an upstream position for closing the communication between the low pressure chamber 613 and the intermediate chamber 624 (via the inner channel 620), wherein the discharging flap 671 is in abutment on the discharging seat 621; and a downstream position for opening the communication between the low pressure chamber 613 and the intermediate chamber 624 (via the inner channel 620), wherein the discharging flap 671 is detached from the discharging seat 621.

The second pressure regulator 6 also comprises a first biasing member 68, in this case a helical spring, compressed between the piston 62 and the upstream body 63 and biasing the piston 62 towards the downstream body 61 (in other words in the direction of a pressing of the piston 62 against the downstream body 61).

The second pressure regulator 6 also comprises a second biasing member 69, in this case a helical spring, compressed between the piston 62 and a plate 673 secured to the valve rod 67. The second biasing member 69 extends to the interior of the first biasing member 68, and the plate 673 may for example be formed of a circlip tightened around the valve rod 67. The second biasing member 69 biases the valve rod 67, relative to the piston 62, in the direction of a pressing of the discharging flap 671 against the discharging seat 621, in other words in the direction of the discharging flap 671 towards the upstream closed position.

The second pressure regulator 6 is thus relatively close to the first pressure regulator described above, with a first difference which lies in a difference in the dimensions because the upstream pressure of the second pressure regulator 6 corresponds to the downstream pressure of the first pressure regulator 5, in other words at the pressure relieved by the first pressure regulator 5.

The first pressure regulator 5 has the function of expanding a high pressure, in particular in the range of 350 to 700 bars, in order to deliver a medium pressure at the outlet, in particular in the range of 10 to 30 bars, and the second pressure regulator 6 has the function of expanding the medium pressure, in particular in the range of 10 to 30 bars, in order to deliver a low pressure at the outlet, in particular in the range of 0.5 to 5 bars.

Thus, the piston 62 of the second pressure regulator 6 has an upper face whose area is greater than that of the piston 52 of the first pressure regulator 5. The biasing members 68, 69 also have spring coefficients different from those of the biasing members 58, 59.

A second difference is that the second pressure regulator 6 comprises a safety system 601, with manual reset, in the event of a pressure drop in the low pressure chamber 613 (equivalent to an over-flow at the outlet of the second pressure regulator 6) which would result in a downstream leak, and in particular a leak in the withdrawing device.

Such a safety system 601 has the following functions: shutting off the communication between the low pressure chamber 613 and the high pressure chamber 66 in the event that the downstream pressure (pressure in the low pressure chamber 613) drops below a low threshold pressure PSB (or set value); prohibiting the second pressure regulator 6 to be put back into operation while the pressure drop fault (or leak in the withdrawing device) has not been resolved; and allowing the second pressure regulator 6 to be put back into operation only by manual reset, once the pressure drop fault (or a leak in the withdrawing device) has been resolved.

The low threshold pressure PSB can be established by considering a maximum value QM of gas flow at the outlet of the second pressure regulator 6 which is considered to be a high threshold not to be exceeded for the flow because it reflects a malfunction at the level of the withdrawing device which may correspond to a leak. The maximum value QM is then to be compared to a difference between the nominal pressure at the outlet of the second pressure regulator 6 (which corresponds to the operating pressure by the withdrawing device) and the low threshold pressure PSB.

The safety system 601 comprises a shutter finger 602 movably mounted in the downstream body 61 opposite the open upper end of the valve rod 67, wherein the shutter finger 602 is selectively movable between a lowered position (visible in FIGS. 24 and 27) wherein the shutter finger 602 is brought closer to the open upper end of the valve rod 67 and is thus able to plug the upper end to close the communication between the lower pressure chamber 613 and the high pressure chamber 66; and a raised position (visible in FIGS. 25 and 26) wherein the shutter finger 602 is moved away from the open upper end of the valve rod 67.

The shutter finger 602 is slidably mounted in an orifice 615 formed through the downstream body 61, with the interposition of two O-ring seals 616; a leakage conduit 617 connected to the leakage circuit 10 is formed in the downstream body 61 by opening into the orifice 615 between the two seals 616.

The safety system 601 comprises an adjustment screw 603 screwed into a thread provided in the orifice 615, above the shutter finger 602, the adjustment screw 603 being accessible from the outside to allow the shutter finger 602 to be selectively displaced by screwing/unscrewing the adjustment screw 603 which comes into abutment on the shutter finger 602.

The safety system 601 comprises a stop screw 604 which is also screwed into a thread provided in the orifice 615, above the adjustment screw 603. The stop screw 604 is hollow, to allow access with a suitable tool for the adjustment screw 603, and the stop screw 604 forms an upper stop abutment for the adjustment screw 603; a lower stop abutment for the adjustment screw 603 being formed by an inner shoulder 605 in the orifice 615.

The following description relates to the operation of the second pressure regulator 6.

FIG. 24 illustrates a configuration, which corresponds to a locked configuration inhibiting the regulation for the second pressure regulator 6, with the safety system 601 in closed mode. This configuration corresponds to a configuration when the device 1 is switched on (or when it starts up), and also to a configuration after the safety system 601 has been closed automatically following a drop in downstream pressure below the low threshold pressure.

In this configuration, the adjustment screw 603 is on its lower stop abutment, so that the shutter finger 602 is in the lowered position; the piston 62 is raised in the direction of the lower face of the downstream body 61 under the action of the first biasing member 68, thus raising the valve rod 67 so that the open upper end of the valve rod 67 bears against the shutter finger 602 which then blocks the inner channel 670 at the upper end, thus closing the communication between the low pressure chamber 613 and the high pressure chamber 66.

In this configuration, if an upstream pressure (at the inlet of the second pressure regulator 6) is present, the safety system 601 will remain closed and the second pressure regulator 6 will remain closed, and only an automatic reset will allow the second pressure regulator 6 to be put back into operation.

FIG. 25 illustrates a configuration unlocked in the first reset phase, wherein the adjustment screw 603 is brought up to the abutment on the stop screw 604; the piston 62 is raised until it comes into abutment on the lower face of the downstream body 61 under the action of the first biasing member 68, thus exerting a thrust on the shutter finger 602 which is free to move up towards its raised position (without necessarily reaching completely its raised position); and the connection with the withdrawing device at the level of the withdrawing connector 25 is closed, so that a downstream pressure (pressure in the low pressure chamber 613) can be established.

FIG. 26 illustrates a configuration unlocked in the second reset phase, wherein an upstream pressure (at the inlet of the second pressure regulator 6 or pressure in the high pressure chamber 66) is applied (in particular after opening of the gate 40); under the effect of the upstream pressure, the shutter finger 602 is pushed towards its raised position so that the shutter finger 602 is no longer in abutment on the open upper end of the valve rod 67, and that the communication is reestablished between the low pressure chamber 613 and the high pressure chamber 66; the regulating flap 672 is in the downstream opening position and the expansion takes place at the expansion seat 652, the gas passing through the inner channel 670 of the valve rod 67 to reach the low pressure chamber 613; the pressure in the low pressure chamber 613 acts on the piston 62 in the direction of separation from the downstream body 61, so that the regulation is established in the second pressure regulator 6; and the discharging flap 671 is in the upstream closed position under the action of the second biasing member 69.

FIG. 27 illustrates an open regulating configuration, wherein the connection with the withdrawing device at the level of the withdrawing connector 25 is open; the adjustment screw 603 is lowered onto its lower stop abutment, so that the shutter finger 602 is brought into the lowered position; under the effect of the downstream pressure (in the low pressure chamber 613), the piston 62 is sufficiently far from the downstream body 61 so that the shutter finger 602 does not come into abutment on the open upper end of the valve rod 67, indeed the clearance difference between the stroke of the adjustment screw 603 and the stroke of the piston 62 is provided so that the shutter finger 602 does not block the open upper end of the valve rod 67 in the open regulating configuration.

If the downstream pressure (pressure in the low pressure chamber 613) goes below a low threshold pressure (reflecting, as a reminder, an overflow at the outlet and therefore a downstream leak), the piston 62 rises (under the effect of the first biasing member 68) until the shutter finger 602 comes into abutment on the open upper end of the valve rod 67, and the second pressure regulator 6 returns to the configuration of FIG. 24.

If the downstream pressure (pressure in the low pressure chamber 613) exceeds a second predefined threshold pressure (which depends on the gas bearing surfaces and the spring coefficients of the biasing members 68, 69), then the operation is similar to that of the first pressure regulator 5, namely that the overpressure in the low pressure chamber 613 acts on the piston 62 in the direction of a separation from the downstream body 61 sufficient for the expansion flap 672 to be in the upstream closed position, under the effect of the second biasing member 69 which pushes the valve rod 67; the valve rod 67 being in abutment on the expansion seat 652 and the piston 62 being sufficiently spaced from the downstream body 61, the discharging flap 671 takes off from the discharging seat 621 and thus passes into the downstream open position, allowing the communication between the low pressure chamber 613 and the discharging conduit 15 connected to the leakage circuit 10, and thus the discharge takes place in the leakage circuit 10 and the downstream pressure is released.

In the second pressure regulator 6, the discharging flap 671, the discharging seat 621 and the second biasing member 69 together form the discharging valve 60 mentioned previously with reference to FIG. 1.

Figure 8:
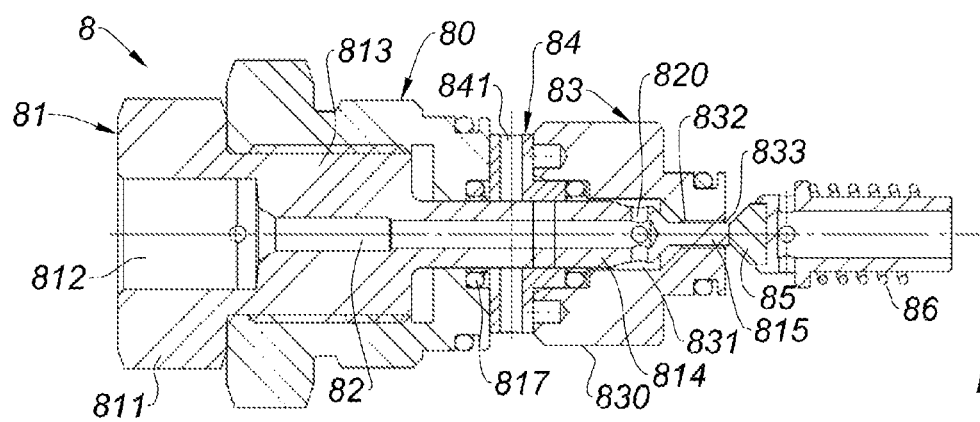
FIGS. 8 and 9 are schematic cross-sectional views of a filling connector of the device of FIGS. 2 to 7, in an open position (FIG. 8) and in a closed position (FIG. 9)

The filling connector 8 is described below with reference to FIGS. 8 and 9.

The filling connector 8 comprises a static hollow upstream body 80 forming a cover or plug accessible from the outside and provided with an outer thread 800 for fixing by screwing in the body 13, the hollow body 80 having an extended inner thread 801 through a central hole 802.

The filling connector 8 comprises a piston 81 screwed into the inner thread 801 of the upstream body 80 and internally having a filling duct 82.

The piston 81 has successively a gripping portion 811 allowing manual grasping or with suitable tools, in order to screw/unscrew the piston 81, and in which is provided a female socket 812, in communication with the filling duct 82, provided for a connection with a male socket of the gas source SO; a threaded portion 813 screwed into the inner thread 801 of the upstream body 80; a smooth portion 814; and an end portion 815 forming a thrust finger.

The filling duct 82 opens at the end of the smooth portion 814, before the end portion 815, via peripheral holes 820.

The smooth portion 814 also has at least one drain orifice 816 opening transversely into the filling duct 82, at a distance from the peripheral holes 820.

The filling connector 8 comprises a static downstream body 83 provided with an outer thread 830 for a fixing by screwing in the body 13, and more specifically for fixing to the bottom of the corresponding bore, until the downstream body 83 or in abutment on an inner shoulder of the bore.

The downstream body 83 has an inner channel having successively an enlarged upstream part 831 inside which the filling duct 82 opens via the peripheral holes 820; and a narrowed downstream part 832 crossed by the end portion 815, the downstream part 832 having a downstream end forming a seat 833.

The filling connector 8 comprises a drain body 84 interposed between the upstream body 80 and the downstream body 83 and having at least one drain duct 841 connected to the leakage circuit 10 or to the safety circuit 9 via a drain channel or duct 16 formed in the body 13 and visible in FIG. 13. The drain duct 841 opens out at the periphery of the smooth portion 814 of the piston 81, between two seals 817 mounted around the smooth portion 814 in the upstream body 80 and the downstream body 83 respectively.

The filling connector 8 further comprises an isolation flap 85 movable relative to the seat 833, inside the bore of the body 13, between an upstream position for closing the filling duct 82 (visible in FIG. 9) wherein the isolation flap 85 bears on the seat 833, thus cutting off the communication between the filling duct 82 and the upstream end 72 of the filling circuit 7; a downstream position for opening the filling duct 82 (visible in FIG. 8) wherein the isolation flap 85 is detached from the seat 833, thus establishing communication between the filling duct 82 and the upstream end 72 of the filling circuit 7.

The filling connector 8 also comprises a biasing member 86, in particular of the helical spring type, which biases the isolation flap 85 towards the upstream closed position.

Figure 9:
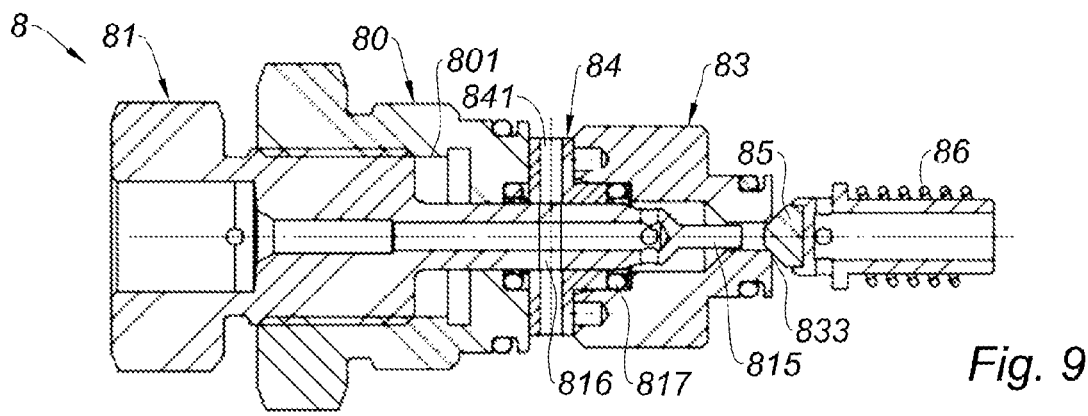

The piston 81 is displaceable by screwing/unscrewing selectively between an open position (illustrated in FIG. 8) and a closed position (illustrated in FIG. 9).

In general, the piston 81 is displaceable by any mechanical action ensuring a translational movement of the piston between its open position and its closed position, wherein the piston 81 remains sealed in the upstream body 80. As an alternative example, the piston 81 may be displaceable with a quarter-turn mechanism or other equivalent mechanism.

In the open position, the piston 81 is screwed downstream so that the end portion 815 exerts a thrust on the isolation flap 85, against the biasing member 86, towards its open position; and the drain orifice 816 provided on the piston 81 does not coincide with the drain duct 841 provided on the drain body 84.

In the closed position, the piston 81 is unscrewed upstream so that the end portion 815 is moved away from the isolation flap 85 which is biased by the biasing member 86 towards its closed position; and the drain orifice 816 provided on the piston 81 coincides with the drain duct 841 provided on the drain body 84 to establish communication between the filling duct 82 and the leakage circuit 10 or the safety circuit 9.

Thus, in operation, the piston 81 is in its closed position and the source of gas SO is connected to the socket 812, then the piston 81 is screwed towards its open position and the source of gas SO is open to fill the storage container RE.

At the end of the filling, the source of gas SO is closed, the piston 81 is unscrewed towards its closed position so that an automatic depressurization of the filling duct 82 takes place through the drain orifice 816 towards the leakage circuit 10 or the safety circuit 9, and finally the source of gas SO is disconnected from the female socket 812.

Referring to FIGS. 29 and 30, the high pressure safety valve 93 has an inlet 930 connected to the upstream end 21 of the withdrawing circuit 2, in other words connected to the outlet of the filling connector 8 and to the main conduit 31 of the storage connector 3; and an outlet 931 connected to the upstream end 92 of the safety circuit 9 (or collection point on the outside).

The high pressure safety valve 93 comprises a flap 932 bearing on a seat 933 open on the inlet, under the effect of a biasing member 934.

If the pressure at the inlet 930 exceeds a threshold value greater than the maximum pressure provided in the storage container RE (threshold value for example in the range of 730 to 780 bars), the flap 932 is opened under the effect of the high pressure and places the inlet 930 and the outlet 931 in communication. The high pressure safety valve 93 thus has the function of evacuating the gas to the outside in the event of excessive pressure in the device 1.

Referring to FIGS. 31 and 32, the high temperature safety valve 94 has an inlet 940 connected to the upstream end 21 of the withdrawing circuit 2, in other words connected to the outlet of the filling connector 8 and to the main conduit 31 of the storage connector 3; and an outlet 941 connected to the upstream end 92 of the safety circuit 9 (or collection point on the outside), the outlet 931 being provided with a constriction forming a calibrated orifice for limiting the flow.

The high temperature safety valve 94 includes a piston 942 provided with a rod 943 which cuts off the communication between the inlet 940 and the outlet 941, and a base 944 bearing on a thermally fusible pellet 945, itself bearing on a sintered metal screen 947.

A biasing member 946 bears on the base 944 to bias the piston 942 against the thermally fusible pellet 945.

As visible in FIG. 32, if the temperature is below a threshold value (for example in the range of 90 and 120° C.), the thermally fusible pellet 945 is not melted and the rod 943 cuts off communication between the inlet 940 and outlet 941, so that the high temperature safety valve 94 is closed.

As visible in FIG. 31, if the temperature is higher than the threshold value, the thermally fusible pellet 945 is melted and the rod 943 is biased by the biasing member 946 and/or by the input pressure, in the direction of an opening of the communication between the inlet 940 and the outlet 941, so that the high temperature safety valve 94 is open.

Figure 19:
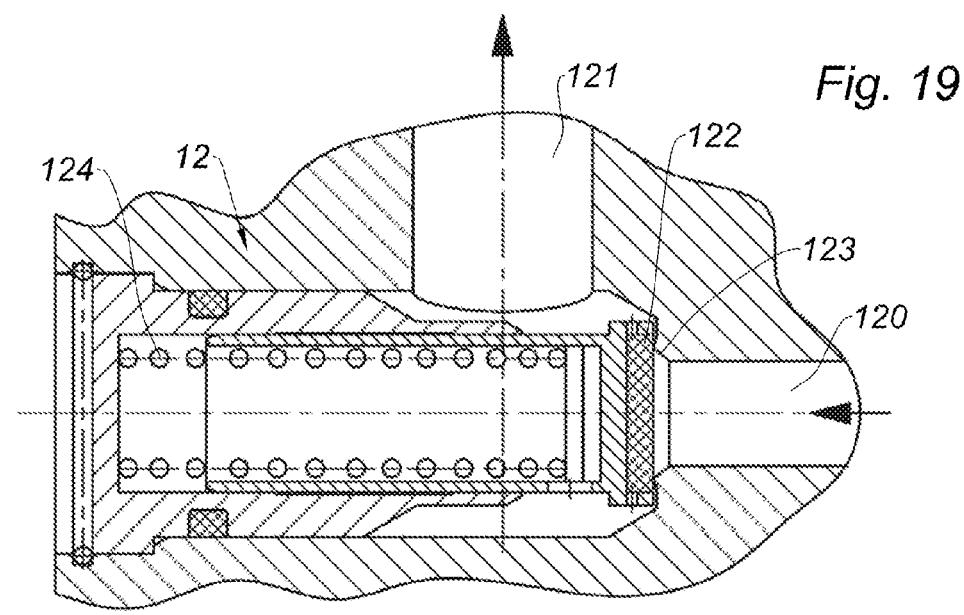
FIG. 19 is a schematic cross-sectional view of a low pressure safety valve of the device of FIGS. 2 to 7, illustrated in a test body (and not in the body of the device) for clarity.

Referring to FIG. 19, the low pressure safety valve 12 has an inlet 120 connected to the downstream end 22 of the withdrawing circuit 2; and an exhaust outlet 121 connected to the leakage circuit 10 upstream of the check valve 11.

The low pressure safety valve 12 comprises a flap 122 bearing on a seat 123 open on the inlet 120, under the effect of a biasing member 124. If the pressure at the inlet 120 exceeds a threshold value greater than the maximum pressure provided in the withdrawing device (threshold value for example in the range of 2 to 5 bars), the flap 122 opens under the effect of the pressure and connects the inlet 120 and the outlet 121. The low pressure safety valve 12 thus has the function of evacuating the gas to the outside in the event of excessive pressure in the withdrawing device.

It should be noted that the device 1 can do without the low pressure safety valve 12 if it is redundant with a safety valve integrated into the withdrawing device. Of course, if the withdrawing device has its own safety valve, the low pressure safety valve 12 can still be present in the device 1.

The device 1 described above thus has many advantages in terms of quality and precision of the expansion, thanks to two pressure regulators 5, 6 in series which allow an expansion on two stages; improved safety in the event of malfunctions or incidents, thanks in particular to the discharging valves 50, 60 integrated in the pressure regulators 5, 6, the safety system 601 and other safety systems whose high pressure safety valve 93 and the high temperature safety valve 94; improved safety during filling operations thanks to the filling connector 8 which integrates an automatic depressurization (or drain) function during disconnection between the filling connector and the source of pressurized gas; improved safety against leaks thanks to a leakage circuit 10 which collects the leakage, discharge and drain ducts 14, 15, 16, 17, 18, 32, which are systematically surrounded by two seals forming particularly effective double sealing barriers to provide that there is no leakage in the device 1 to the outside, upstream and downstream; and compactness and lightness with a body 13 improved to accommodate the numerous components in suitable bores and the numerous channels and conduits of the various circuits 2, 7, 9 and 10.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A pressure regulator comprising:
   a static downstream body delimiting a low pressure chamber at an outlet of the pressure regulator;
   an upstream body delimiting a high pressure chamber at an inlet of the pressure regulator and carrying an expansion seat disposed opposite an inner channel formed in an upper portion of the upstream body;
   a movable piston forming a regulation part on which gas from a low pressure chamber press on one side and a first biasing member press on the other side; and
   a regulating flap cooperating with the piston and movable relative to the expansion seat between an upstream position for closing communication between the low pressure chamber and the high pressure chamber and a downstream position for opening communication between the low pressure chamber and the high pressure chamber,
   wherein the piston has an inner channel passing through and having two opposite ends:
     an open upper end, on the side of the downstream body, facing the low pressure chamber and forming a discharging seat; and
     a lower end which opens onto an intermediate chamber interposed between the upstream body and the downstream body, wherein said intermediate chamber is connected to a leakage circuit,
   wherein the pressure regulator further comprises a tubular valve rod provided with an inner channel, the valve rod passing through both the inner channel of the piston and the inner channel of the upper portion of the upstream body, so that the valve rod presents:
     a flared upper end forming a discharging flap suitable for bearing on the discharging seat provided at the upper end of the inner channel of the piston; and
     a lower end forming the regulating flap suitable for bearing on the expansion seat,
   wherein the first biasing member is compressed between the piston and the upstream body by biasing the piston towards the downstream body, and a second biasing member is compressed between the piston and a plate secured to the valve rod and biasing the valve rod, relative to the piston, in a direction of pressing a discharging valve against the discharging seat.

2. The pressure regulator according to claim 1, wherein the second biasing member extends inside the first biasing member.

3. The pressure regulator according to claim 1, wherein the plate is formed of a circlip around the valve rod.

4. The pressure regulator according to claim 1, wherein the upper portion of the upstream body is provided with an outer thread for fixing by screwing into a bore.

5. The pressure regulator according to claim 1, wherein the upstream body has the upper portion extended by a lower portion, wherein the upper portion faces the piston, and said lower portion has a lower dome bearing on a bottom of a bore for a gas inlet, wherein the lower dome is provided with lateral holes opening into the high pressure chamber.

6. The pressure regulator according to claim 5, wherein the lower dome has an upper face facing the lower end of the inner channel of the upper portion of the upstream body, and a cavity is formed in the upper face to form the expansion seat.

7. The pressure regulator according to claim 5, wherein the lower portion of the upstream body comprises a cylindrical wall which surrounds the upper face of the lower dome, wherein the cylindrical wall is provided with lateral holes opening into the high pressure chamber.

8. The pressure regulator according to claim 1, wherein the downstream body forms a cover or plug accessible from an outside of a body.

9. The pressure regulator according to claim 1, wherein the downstream body has at an outer periphery two O-ring seals inside a bore, and a leakage conduit connected to the leakage circuit opens into the bore between the two seals.

10. The pressure regulator according to claim 1, wherein the downstream body is fixed by screwing inside a bore.

11. The pressure regulator according to claim 1, wherein the pressure regulator comprises a safety system with manual reset configured to automatically close communication between the low pressure chamber and the high pressure chamber when the downstream pressure in the low pressure chamber goes below a predefined low threshold pressure corresponding to an increase in the gas flow at the outlet of the pressure regulator, in particular associated with a downstream leak.

12. The pressure regulator according to claim 11, wherein the safety system comprises a shutter finger movably mounted in the downstream body opposite the open upper end of the valve rod, wherein the shutter finger is selectively movable between:
 a lowered position wherein the shutter finger is brought closer to the open upper end of the valve rod; and
 a raised position wherein the shutter finger is moved away from the open upper end of the valve rod.

13. The pressure regulator according to claim 12, wherein the shutter finger is slidably mounted in an orifice formed through the downstream body.

14. The pressure regulator according to claim 13, wherein the shutter finger has at an outer periphery two O-ring seals inside the orifice of the downstream body, a leakage conduit connected to the leakage circuit being formed in the downstream body opening into said orifice between the two seals.

15. The pressure regulator according to claim 13, wherein the safety system comprises an adjustment screw screwed into a thread provided in the orifice of the downstream body to allow the shutter finger to be selectively displaced by screwing and/or unscrewing the adjustment screw which abuts on the shutter finger.

16. The pressure regulator according to claim 15, wherein the safety system comprises a hollow stop screw screwed into a thread provided in the orifice of the downstream body to form an upper stop abutment for the adjustment screw, and a lower stop abutment for the adjustment screw is formed by an inner shoulder in said orifice.

17. A device for filling and withdrawing gas, the device comprising:
 a withdrawing circuit comprising an upstream end provided with a storage connector configured for a connection with a container for storing a pressurized gas, and a downstream end provided with a withdrawing connector configured for a connection with a withdrawing device for withdrawing gas at reduced pressure, wherein said withdrawing circuit comprises at least one driven isolation gate and at least one pressure regulator; and
 a filling circuit comprising an upstream end provided with a filling connector configured for a connection with a source of pressurized gas for filling a storage container, and a downstream end connected to the upstream end of the withdrawing circuit,
 wherein the at least one pressure regulator is in accordance with claim 1.

18. The device according to claim 17, wherein the withdrawing circuit comprises a first pressure regulator and a second pressure regulator in series, wherein each pressure regulator is in accordance with claim 1.

19. The device according to claim 17, wherein the withdrawing circuit comprises a first pressure regulator and a second pressure regulator in series, and wherein only the second pressure regulator is in accordance with claim 11.

20. A use of a device according to claim 17, wherein the storage connector is connected to a storage container of pressurized hydrogen gas and the withdrawing connector is connected to a withdrawing device of a fuel cell type.

* * * * *